US012791458B2

(12) United States Patent
Hamada et al.

(10) Patent No.: US 12,791,458 B2
(45) Date of Patent: Nov. 10, 2026

(54) DYNAMIC LIGHT SCATTERING MEASUREMENT METHOD AND DYNAMIC LIGHT SCATTERING MEASUREMENT DEVICE

(71) Applicant: FUJIFILM Corporation, Tokyo (JP)

(72) Inventors: Kenichi Hamada, Kanagawa (JP); Sohichiro Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 446 days.

(21) Appl. No.: 18/361,890

(22) Filed: Jul. 30, 2023

(65) Prior Publication Data

US 2023/0375455 A1 Nov. 23, 2023

Related U.S. Application Data

(63) Continuation of application No. PCT/JP2022/000853, filed on Jan. 13, 2022.

(30) Foreign Application Priority Data

Feb. 2, 2021 (JP) ................................ 2021-015324

(51) Int. Cl.
*G01N 15/0205* (2024.01)

(52) U.S. Cl.
CPC . *G01N 15/0211* (2013.01); *G01N 2015/0222* (2013.01)

(58) Field of Classification Search
CPC ....... G01N 15/0211; G01N 2015/0222; G01N 2015/0053; G01N 2015/025; G01N 2021/4711
See application file for complete search history.

(56) References Cited

U.S. PATENT DOCUMENTS 6,721,051 B2 4/2004 Mengucet et al.
10,197,485 B2 2/2019 Corbett et al.
(Continued)

FOREIGN PATENT DOCUMENTS

CN 105891066 A * 8/2016 ......... G01N 15/0211
JP 2013205145 10/2013
(Continued)

OTHER PUBLICATIONS

"Search Report of Europe Counterpart Application", issued on Jul. 12, 2024, p. 1-p. 10.
(Continued)

*Primary Examiner* — Kara E. Geisel
*Assistant Examiner* — Christina I Xing
(74) *Attorney, Agent, or Firm* — JCIPRNET

(57) ABSTRACT

Provided are a dynamic light scattering measurement method and a dynamic light scattering measurement device with which a particle size distribution of each type of particle included in a dispersion liquid including particles is obtained. A dynamic light scattering measurement method for a dispersion liquid including a plurality of types of particles includes a measurement step of measuring a scattering intensity of the dispersion liquid a plurality of times to obtain a plurality of pieces of scattering intensity data while changing a value of any one of at least a scattering angle or a measurement wavelength among measurement parameters, a calculation step of calculating a plurality of pieces of scattering intensity time variation characteristic data and a plurality of scattering intensity parameter-dependent data from the plurality of pieces of scattering intensity data obtained by the measurement step, and a step of obtaining a particle size distribution of each type of particle of a plurality of types of particles by fitting the plurality of pieces of scattering intensity time variation characteristic
(Continued)

data and the plurality of pieces of scattering intensity parameter-dependent data, which are obtained by the calculation step, with respect to a theoretical formula that defines a relationship between a particle diameter and the scattering intensity.

18 Claims, 15 Drawing Sheets

(56) References Cited

U.S. PATENT DOCUMENTS

| | | | | |
|---|---|---|---|---|
| 10,520,412 | B2 | 12/2019 | Corbett et al. | |
| 10,845,287 | B2 | 11/2020 | Corbett et al. | |
| 11,435,275 | B2 | 9/2022 | Corbett et al. | |
| 2008/0285032 | A1 | 11/2008 | Ohkubo | |
| 2011/0181869 | A1 | 7/2011 | Yamaguchi et al. | |
| 2018/0313738 | A1 * | 11/2018 | Kawano | G01N 15/0211 |
| 2019/0234862 | A1 | 8/2019 | Schladitz et al. | |

FOREIGN PATENT DOCUMENTS

| | | | | |
|---|---|---|---|---|
| JP | 5841475 | | 1/2016 | |
| JP | 5841475 | B2 * | 1/2016 | |
| JP | 2016133435 | | 7/2016 | |
| JP | 2018535429 | | 11/2018 | |
| WO | 2011045961 | | 4/2011 | |
| WO | WO-2011045961 | A1 * | 4/2011 | G01N 15/0205 |
| WO | 2017069260 | | 4/2017 | |

OTHER PUBLICATIONS

"Office Action of Korea Counterpart Application", issued on Jul. 30, 2025, with English translation thereof, p. 1-p. 17.

"International Search Report (Form PCT/ISA/210) of PCT/JP2022/000853", mailed on Apr. 5, 2022, with English translation thereof, pp. 1-5.

"Written Opinion of the International Searching Authority (Form PCT/ISA/237) of PCT/JP2022/000853", mailed on Apr. 5, 2022, with English translation thereof, pp. 1-8.

"Request for the Submission of an Opinion of Korea Counterpart Application", issued on Oct. 31, 2024, with English translation thereof, pp. 1-13.

"Notice of Reasons for Refusal of Japan Counterpart Application", issued on Dec. 9, 2025, with English translation thereof, p. 1-p. 6.

"Office Action of China Counterpart Application", issued on Feb. 11, 2026, with English translation thereof, p. 1-p. 20.

"Office Action of Europe Counterpart Application", issued on Mar. 5, 2026, p. 1-p. 13.

"The Second Office Action of China Counterpart Application", issued on Aug. 3, 2026, with English translation thereof, p. 1-p. 20.

* cited by examiner

DYNAMIC LIGHT SCATTERING MEASUREMENT METHOD AND DYNAMIC LIGHT SCATTERING MEASUREMENT DEVICE

CROSS-REFERENCE TO RELATED APPLICATIONS

This application is a Continuation of PCT International Application No. PCT/JP2022/000853 filed on Jan. 13, 2022, which claims priority under 35 U.S.C. § 119(a) to Japanese Patent Application No. 2021-015324 filed on Feb. 2, 2021. The above applications are hereby expressly incorporated by reference, in their entirety, into the present application.

BACKGROUND OF THE INVENTION

1. Field of the Invention

The present invention relates to a dynamic light scattering measurement method and a dynamic light scattering measurement device for a dispersion liquid including particles.

2. Description of the Related Art

There is a known dynamic light scattering measurement method that checks dynamic characteristics of scatterers by applying light to a medium, such as a colloidal solution or a particle dispersion liquid, and detecting a time variation of a scattered light intensity scattered from the scatterers in the medium using a time correlation function or a power spectrum. The dynamic light scattering measurement method has been widely used in various kinds of measurement, such as particle diameter measurement.

JP2018-535429A describes a method of evaluating characteristics of particles in a sample, the method comprising: irradiating the sample in a sample cell with rays to generate scattered light by means of interaction of the rays and the sample, acquiring a time series of measured values of scattered light from a single detector, determining, from the time series of the measured values from the single detector, which measured values are acquired when a large particle is contributing to the scattered light, the determining of which measured values are acquired when the large particle is contributing to the scattered light including dividing the time series into a plurality of short sub-runs, executing a correlation on each sub-run, and then determining which of the sub-runs includes measured values with a scattering contribution from the large particle, and determining a particle size distribution from the time series of the measured values, including correcting light scattered by the large particle, and the correcting including excluding or separately analyzing sub-runs acquired when the large particle is contributing to the scattered light. Here, the sub-runs are execution data for a part taken out from time-series data measured a plurality of times or for a long time.

SUMMARY OF THE INVENTION

In WO2018-535429A, in determining the particle size distribution, an influence of the large particle is eliminated and a small particle is evaluated. Note that, in WO2018-535429A, a particle size distribution of each type of particle included in a dispersion liquid including particles cannot be obtained.

An object of the present invention is to provide a dynamic light scattering measurement method and a dynamic light scattering measurement device with which a particle size distribution of each type of particle included in a dispersion liquid including particles is obtained.

To attain the above-described object, an aspect of the present invention provides a dynamic light scattering measurement method for a dispersion liquid including a plurality of types of particles, the dynamic light scattering measurement method comprising a measurement step of measuring a scattering intensity of the dispersion liquid a plurality of times to obtain a plurality of pieces of scattering intensity data while changing a value of any one of at least a scattering angle or a measurement wavelength among measurement parameters, a calculation step of calculating a plurality of pieces of scattering intensity time variation characteristic data and a plurality of pieces of scattering intensity parameter-dependent data from the plurality of pieces of scattering intensity data obtained by the measurement step, and a step of obtaining a particle size distribution of each type of particle of a plurality of types of particles by fitting the plurality of pieces of scattering intensity time variation characteristic data and the plurality of pieces of scattering intensity parameter-dependent data, which are obtained by the calculation step, with respect to a theoretical formula that defines a relationship between a particle diameter and the scattering intensity.

An aspect of the present invention provides a dynamic light scattering measurement method for a dispersion liquid including particles, the dynamic light scattering measurement method comprising a measurement step of measuring a scattering intensity of the dispersion liquid a plurality of times to obtain a plurality of pieces of scattering intensity data while changing a value of any one of at least a scattering angle or a measurement wavelength among measurement parameters, a calculation step of calculating a plurality of pieces of scattering intensity time variation characteristic data and a plurality of pieces of scattering intensity parameter-dependent data from the plurality of pieces of scattering intensity data obtained by the measurement step, a determination step of determining types of particles included in the dispersion liquid by fitting the plurality of pieces of scattering intensity time variation characteristic data and the plurality of pieces of scattering intensity parameter-dependent data, which are obtained by the calculation step, with respect to a theoretical formula that defines a relationship between a particle diameter and the scattering intensity, and a step of obtaining a particle size distribution of each of the types of particles in the dispersion liquid determined by the determination step.

It is preferable that the measurement parameter is the scattering angle.

It is preferable that the measurement parameter is the measurement wavelength.

It is preferable that the measurement parameters are the scattering angle and the measurement wavelength.

It is preferable that, in the measurement step, a light intensity of a polarized component of scattered light of the dispersion liquid obtained by irradiating the dispersion liquid with incident light having specific polarization is measured as the scattering intensity.

It is preferable that, in the measurement step, at least one of scattering intensity parameter-dependent data obtained by successively irradiating the dispersion liquid with incident light having a plurality of polarization states or scattering intensity parameter-dependent data obtained by extracting a polarized component of scattered light emitted from the dispersion liquid a plurality of times is measured.

It is preferable that each of profiles of scattering intensities obtained by changing the values of the measurement parameters is different for each type of particle of a plurality of types of particles.

It is preferable that the calculated scattering intensity time variation characteristic data of the measurement parameters and the calculated scattering intensity parameter-dependent data of the measurement parameters are calculated based on at least one of a Mie scattering theoretical formula, a discrete dipole approximation method, or a Stokes-Einstein's theoretical formula.

An aspect of the present invention provides a dynamic light scattering measurement device for a dispersion liquid including a plurality of types of particles, the dynamic light scattering measurement device comprising a parameter setting unit that changes a value of any one of at least a scattering angle or a measurement wavelength as measurement parameters, a scattered light measurement unit that measures a scattering intensity of the dispersion liquid a plurality of times to obtain a plurality of pieces of scattering intensity data while changing, at the parameter setting unit, the value of any one of at least the scattering angle or the measurement wavelength among the measurement parameters, and a calculation unit that calculates a plurality of pieces of scattering intensity time variation characteristic data and a plurality of pieces of scattering intensity parameter-dependent data from the plurality of pieces of scattering intensity data obtained by the scattered light measurement unit, and obtains a particle size distribution of each type of particle of a plurality of types of particles by fitting the plurality of pieces of calculated scattering intensity time variation characteristic data and the plurality of pieces of calculated scattering intensity parameter-dependent data with respect to a theoretical formula that defines a relationship between a particle diameter and the scattering intensity.

An aspect of the present invention provides a dynamic light scattering measurement device for a dispersion liquid including particles, the dynamic light scattering measurement device comprising a parameter setting unit that changes a value of any one of at least a scattering angle or a measurement wavelength as a measurement parameter, a scattered light measurement unit that measures a scattering intensity of the dispersion liquid a plurality of times to obtain a plurality of pieces of scattering intensity data while changing, at the parameter setting unit, the value of any one of at least the scattering angle or the measurement wavelength among the measurement parameters, and a calculation unit that calculates a plurality of pieces of scattering intensity time variation characteristic data and a plurality of pieces of scattering intensity parameter-dependent data from the plurality of pieces of scattering intensity data obtained by the scattered light measurement unit, determines types of particles in the dispersion liquid by fitting the plurality of pieces of calculated scattering intensity time variation characteristic data and the plurality of pieces of calculated scattering intensity parameter-dependent data with respect to a theoretical formula that defines a relationship between a particle diameter and the scattering intensity, and in a case where the types of particles in the dispersion liquid are determined, obtains a particle size distribution of each particle in the dispersion liquid.

It is preferable that the measurement parameter is the scattering angle.

It is preferable that the measurement parameter is the measurement wavelength.

It is preferable that the measurement parameters are the scattering angle and the measurement wavelength.

It is preferable that the scattered light measurement unit measures a light intensity of a polarized component of scattered light of the dispersion liquid obtained by irradiating the dispersion liquid with incident light having specific polarization, as the scattering intensity.

It is preferable that the scattered light measurement unit measures at least one of scattering intensity parameter-dependent data obtained by successively irradiating the dispersion liquid with incident light having a plurality of polarization states or scattering intensity parameter-dependent data obtained by extracting a polarized component of scattered light emitted from the dispersion liquid a plurality of times.

It is preferable that each of profiles of scattering intensities obtained by changing the values of the measurement parameters is different for each type of particle of a plurality of types of particles.

It is preferable that the calculated scattering intensity time variation characteristic data of the measurement parameters and the calculated scattering intensity parameter-dependent data of the measurement parameters are calculated based on at least one of a Mie scattering theoretical formula, a discrete dipole approximation method, or a Stokes-Einstein's theoretical formula.

According to the present invention, it is possible to provide a dynamic light scattering measurement method and a dynamic light scattering measurement device with which a particle size distribution of each type of particle included in a dispersion liquid including particles is obtained.

DESCRIPTION OF THE PREFERRED EMBODIMENTS

Hereinafter, a dynamic light scattering measurement method and a dynamic light scattering measurement device of the present invention will be described in detail based on a preferred embodiment shown in the accompanying drawings.

The drawings described below are exemplary for describing the present invention, and the present invention is not limited to the drawings described below.

Hereinafter, the expression "to" indicating a numerical range includes numerical values described on both sides. For example, ε is a numerical value α to a numerical value β means that a range of ε is a range including the numerical value α and the numerical value β, and is represented as $\alpha \leq \varepsilon \leq \beta$ by mathematical signs.

Angles, such as "angles represented by specific numerical values" and "vertical", include error ranges generally tolerated in the technique field unless specifically described.

(Dynamic Light Scattering Measurement Device)

Figure 1:
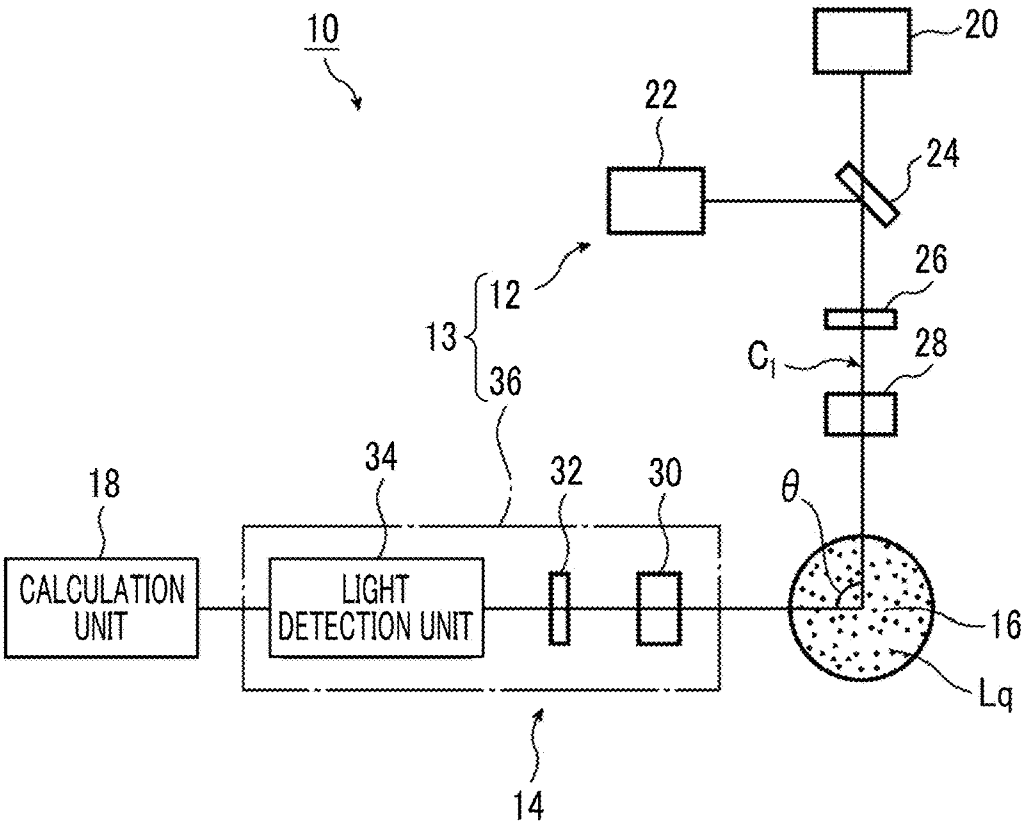
FIG. 1 is a schematic view showing an example of a dynamic light scattering measurement device of an embodiment of the present invention.

FIG. 1 is a schematic view showing an example of a dynamic light scattering measurement device of an embodiment of the present invention.

A dynamic light scattering measurement device 10 shown in FIG. 1 has an incidence setting unit 12 that irradiates a sample cell 16, in which a dispersion liquid Lq including particles is stored, with laser light as measurement light, a scattered light measurement unit 14 that measures a scattering intensity of scattered light generated by scattering of laser light in the dispersion liquid Lq, and a calculation unit 18 that obtains a particle size distribution of each type of particle included in the dispersion liquid.

The incidence setting unit 12 has a first light source unit 20 that emits laser light as input light to the dispersion liquid Lq, a second light source unit 22 that emits laser light as input light to the dispersion liquid Lq, a half mirror 24, a condenser lens 26 that condenses laser light transmitted through or reflected by the half mirror 24 to the sample cell 16, and a polarizing element 28 that transmits only a given polarized component out of laser light.

The half mirror 24 transmits laser light emitted from the first light source unit 20 and reflects laser light emitted from the second light source unit 22, for example, at 90° with respect to an incidence direction to the same optical path as laser light emitted from the first light source unit 20. Laser light transmitted through the half mirror 24 and laser light reflected by the half mirror 24 passes through the same optical axis $C_1$. The condenser lens 26 and the polarizing element 28 are disposed on the optical axis $C_1$. The sample cell 16 is disposed on the optical axis $C_1$.

A shutter (not shown) that temporarily shields an optical path of laser light and a neutral density (ND) filter (not shown) that attenuates laser light may be provided on the optical axis $C_1$ of the laser light.

The ND filter is provided to adjust a light amount of laser light, and a known ND filter can be suitably used.

As the polarizing element 28, a polarizing element according to polarized light with which the sample cell 16 is irradiated, such as circularly polarized light, linearly polarized light, or elliptically polarized light, is suitably used. In a case where it is not necessary to irradiate the sample cell 16 with polarized light, the polarizing element 28 is not always required.

The first light source unit 20 irradiates the dispersion liquid Lq with laser light as input light, and is, for example, an Ar laser that emits laser light having a wavelength of 488 nm. The wavelength of laser light is not particularly limited.

The second light source unit 22 irradiates the dispersion liquid Lq with laser light as input light, and is, for example, a He—Ne laser that emits laser light having a wavelength of 633 nm. The wavelength of laser light is not particularly limited.

The first light source unit 20 and the second light source unit 22 are different in wavelength of laser light. In the dynamic light scattering measurement device 10, an appropriate wavelength is different depending on a target particle to be measured. For this reason, it is desirable to select a combination of wavelengths such that a refractive index difference of a plurality of particles is considerably different between wavelengths.

The incidence setting unit 12 changes a value of a measurement wavelength between at least a scattering angle and a measurement wavelength as measurement parameters. The scattered light measurement unit 14 is rotated by a rotation unit 36 described below, so that the scattering angle is changed. A parameter setting unit 13 is configured with the incidence setting unit 12 and the rotation unit 36 described below. A value of any one of at least the scattering angle or the measurement wavelength as measurement parameters is changed by the parameter setting unit 13.

The measurement wavelength is changed by switching the first light source unit 20 and the second light source unit 22. From this, the light source units according to the number of measurement wavelengths are provided, and the present invention is not limited to the first light source unit 20 and the second light source unit 22. In a case where the measurement wavelength is not changed, one of the first light source unit 20 and the second light source unit 22 may be provided. The light source units may be increased to increase the number of measurement wavelengths.

The sample cell 16 is, for example, a rectangular parallelepiped or columnar container formed of optical glass or optical plastic. The dispersion liquid Lq as a measurement target including particles is stored in the sample cell 16. The dispersion liquid Lq is irradiated with laser light as input light to the dispersion liquid Lq.

The sample cell 16 may be disposed inside an immersion bath (not shown). The immersion bath is provided to eliminate a refractive index difference or to make a temperature uniform.

The scattered light measurement unit 14 measures the scattering intensity of the scattered light generated by scattering of laser light in the dispersion liquid Lq as described above.

While changing, at the incidence setting unit 12, the value of the measurement wavelength between at least the scattering angle and the measurement wavelength as the measurement parameters, the scattered light measurement unit 14 measures the scattering intensity of the dispersion liquid Lq a plurality of times.

The scattered light measurement unit 14 has a polarizing element 30 that transmits only a given polarized component of scattered light from the sample cell 16, a condenser lens 32 that focuses scattered light on a light detection unit 34, and the light detection unit 34 that detects scattered light.

To appropriately set a scattering volume of a sample, a first pinhole (not shown) and a second pinhole (not shown) may be provided.

As the polarizing element 30, a polarizing element according to polarized light to be detected, such as circularly polarized light, linearly polarized light, or elliptically polarized light, is suitably used. The polarizing element 30 may be configured in such a manner that a polarizing element that detects circularly polarized light and a polarizing element that detects linearly polarized light are provided in parallel and are switched according to polarized light to be detected, and the light intensity of each polarized component of scattered light may be detected by the light detection unit 34.

In a case where it is not necessary to measure the light intensity of the polarized component of scattered light, the polarizing element 30 is not always required.

The light detection unit 34 is not particularly limited as long as the intensity of scattered light can be detected, and for example, a photomultiplier tube, a photodiode, an avalanche photodiode, and a time correlator are used.

The rotation unit 36 that rotates the scattered light measurement unit 14 to change an angle of scattered light is provided. An angle θ of scattered light can be changed by the rotation unit 36. The angle θ of scattered light is a scattering angle. In FIG. 1, the angle of scattered light is 90°. That is, the scattering angle is 90°. In a case where the scattering angle θ is not changed, the rotation unit 36 is not always required. As the rotation unit 36, for example, a goniometer is used. For example, the scattered light measurement unit 14 is placed in the goniometer as the rotation unit 36, and the scattering angle θ is adjusted by the goniometer.

The dynamic light scattering measurement device 10 has the first light source unit 20 and the second light source unit 22 that emit different kinds of laser light as described above, and thus, can perform dynamic light scattering measurement at different wavelengths. The dynamic light scattering measurement device 10 has the rotation unit 36 that rotates the scattered light measurement unit 14 as described above, and thus, can perform dynamic light scattering measurement while changing the angle θ of scattered light, that is, the scattering angle.

The calculation unit 18 obtains the particle size distribution of each type of particle of a plurality of types of particles in the dispersion liquid Lq including a plurality of types of particles based on the intensity of scattered light detected by the light detection unit 34.

The calculation unit 18 calculates a plurality of pieces of scattering intensity time variation characteristic data of the measurement parameters and a plurality of pieces of scattering intensity parameter-dependent data of the measurement parameters from a plurality of pieces of scattering intensity data obtained by the scattered light measurement unit 14, and obtains the particle size distribution of each type of particle of a plurality of types of particles by fitting a plurality of pieces of calculated scattering intensity time variation characteristic data of the measurement parameters and a plurality of pieces of calculated scattering intensity parameter-dependent data of the measurement parameters with respect to a theoretical formula that defines a relationship between a particle diameter and the scattering intensity.

In addition to the theoretical formula that defines the relationship between the particle diameter and the scattering intensity, scattering intensity time variation characteristic data of measurement parameters and scattering intensity parameter-dependent data of the measurement parameters calculated by a simulation may be used.

The calculation unit 18 calculates a plurality of pieces of scattering intensity time variation characteristic data of the measurement parameters and a plurality of pieces of scattering intensity parameter-dependent data of the measurement parameters from a plurality of pieces of scattering intensity data obtained by the scattered light measurement unit 14, determines types of particles in the dispersion liquid by fitting a plurality of pieces of calculated scattering intensity time variation characteristic data of the measurement parameters and a plurality of pieces of calculated scattering intensity parameter-dependent data of the measurement parameters with respect to a theoretical formula that defines a relationship between a particle diameter and the scattering intensity, and in a case where the types of particles in the dispersion liquid are determined, obtains a particle size distribution of each particle in the dispersion liquid. The determination of the types of particles in the dispersion liquid will be described below. The fitting will be described below.

The calculation unit 18 calculates the above-described scattering intensity parameter-dependent data based on at least one of a Mie scattering theoretical formula, a discrete dipole approximation method (DDA method), or a Stokes-Einstein's theoretical formula.

A program (computer software) stored in a read only memory (ROM) or the like is executed by the calculation unit 18, whereby the calculation unit 18 obtains the particle size distribution of the particle as described above. The calculation unit 18 may be configured with a computer in which the program is executed as described above, so that each part functions, may be a dedicated device in which each part is configured with a dedicated circuit, or may be configured with a server as being executed on a cloud.

In measuring the scattering intensity of the dispersion liquid, there are the scattering angle and the measurement wavelength as the measurement parameters. In a case where the measurement parameter is the scattering angle, the scattering intensity of the dispersion liquid is measured while changing the scattering angle.

In a case where the measurement parameter is the measurement wavelength, the scattering intensity of the dispersion liquid is measured while changing the measurement wavelength.

Although the scattering intensity can be measured by one measurement device with the dynamic light scattering measurement method or device as described above, measurement data of two different devices of the dynamic light scattering measurement device and a light scattering goniophotometer may be used in combination. In a case of the measurement wavelength, a spectrometer may be employed. As described above, a device form is not limited as using the dynamic light scattering measurement device 10 shown in FIG. 1.

Figure 2:
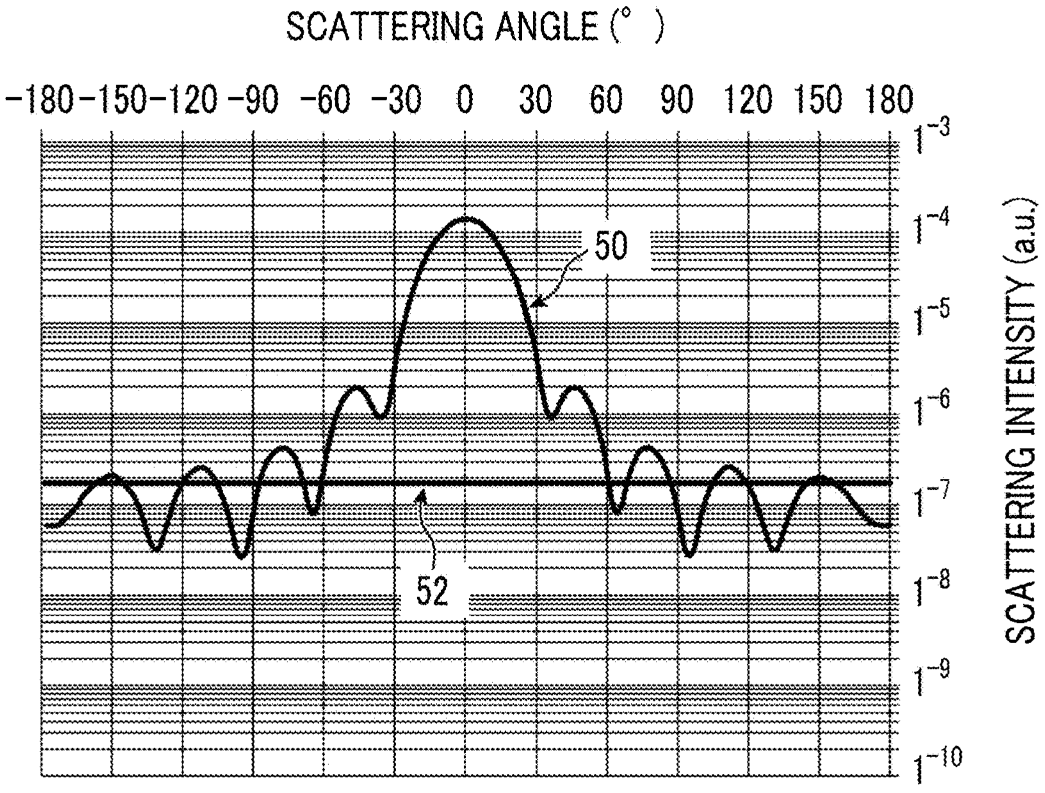
FIG. 2 is a graph showing a relationship between a scattering intensity and a scattering angle.
Figure 3:
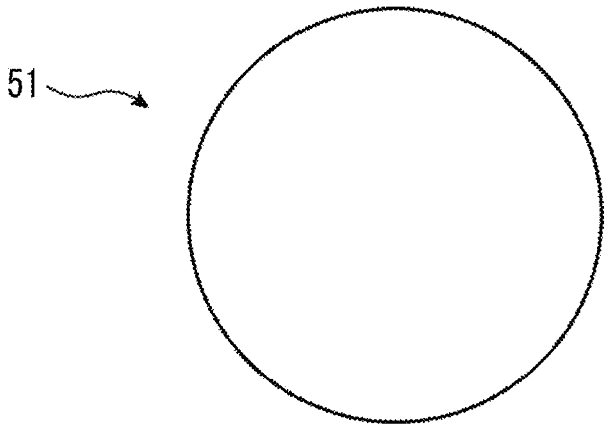
FIG. 3 is a schematic view showing a single particle.
Figure 4:
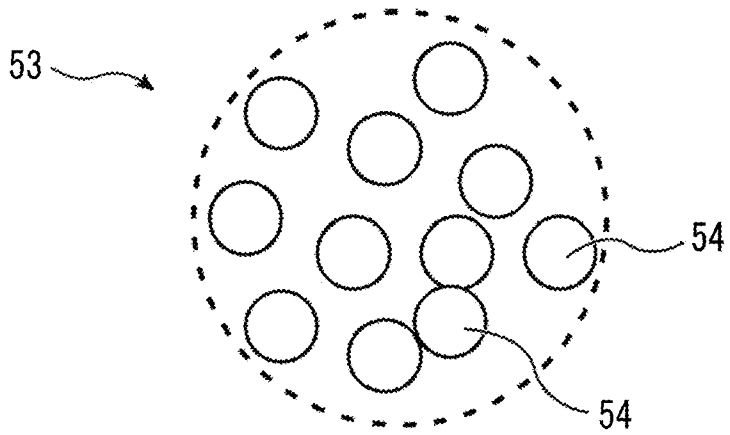
FIG. 4 is a schematic view showing an aggregate having cross-linked and aggregated particles.

FIG. 2 is a graph showing a relationship between a scattering intensity and a scattering angle, FIG. 3 is a schematic view showing a single particle, and FIG. 4 is a schematic view showing an aggregate having cross-linked and aggregated particles.

In the single particle and the aggregate having cross-linked and aggregated particles, the scattering intensity depending on the scattering angle is different as shown in FIG. 2. FIG. 2 shows a time average value of the scattering intensity with respect to the scattering angle.

A profile 50 that shows the scattering intensity of the single particle, shown in FIG. 2 indicates that the scattering intensity varies depending on the scattering angle. A profile 52 that shows the scattering intensity of the aggregate having cross-linked and aggregated particles indicates that the scattering intensity does not vary depending on the scattering angle and has a constant value.

As shown in FIG. 3, a single particle 51 has one particle, and has a diameter of 1000 nm. As shown in FIG. 4, an aggregate 53 having cross-linked and aggregated particles has a plurality of particles 54. While the particles 54 forming the aggregate 53 have a diameter of, for example, 50 nm, the diameter of the entire aggregate 53 is, for example, 1000 nm. The aggregate 53 shown in FIG. 4 is also referred to as a cross-linking aggregate. The aggregate 53 has, for example, the particles 54 having a predetermined size and a solvated polymer between the particles. As the polymer, a polymer having a functional group (for example, a polar group) for aggregating the particles 54 is usually used.

In a case where the single particle and the aggregate have a size comparable to each other, while the single particle of 1000 nm causes strong forward scattering and anisotropic scattering, scattering waves from the cross-linking aggregate (the diameter of the particles forming the cross-linking aggregate is 50 nm) of 1000 nm are superimposed on isotropic scattering waves from the particles forming the cross-linking aggregate, and as a result, are made isotropic. For this reason, for example, even though rheological diameters obtained by dynamic light scattering are equally 1000 nm, a difference in scattering intensity depending on the scattering angle is generated.

Even though a plurality of types of particles are included in a dispersion liquid including particles, a particle size distribution of each type of particle of a plurality of types of particles can be obtained using the difference in scattering intensity depending on the scattering angle of the single particle and the aggregate shown in FIG. 2. The type of particle in the dispersion liquid can also be determined using the difference in scattering intensity with respect to the scattering angle shown in FIG. 2. The particle size distribution of the determined particle can also be obtained. For this reason, the type of particle in the dispersion liquid may be known or may be unknown.

The determination of the type of particle in the dispersion liquid depending on the difference in scattering intensity with respect to the scattering angle described above is performed by the calculation unit 18. For example, the calculation unit 18 detects a difference in scattering intensity from the theoretical formula on an assumption of one type of particle, and in a case where there is the difference, determines that there are a plurality of types of particles in the dispersion liquid.

On an assumption that there are a plurality of types of particles in the dispersion liquid, a theoretical formula that defines a relationship between a particle diameter and a scattering intensity is set, and a particle size distribution of each type of particle of a plurality of types of particles is obtained. In this manner, the particle size distribution of each type of particle included in the dispersion liquid is obtained.

The calculation unit 18 may set a theoretical formula on an assumption that there are a plurality of types of particles in the dispersion liquid. In this case, even in a case where there is one type of particle, not a plurality of types of particles, in the dispersion liquid, particle size distribution of the particle can be obtained.

Figure 5:
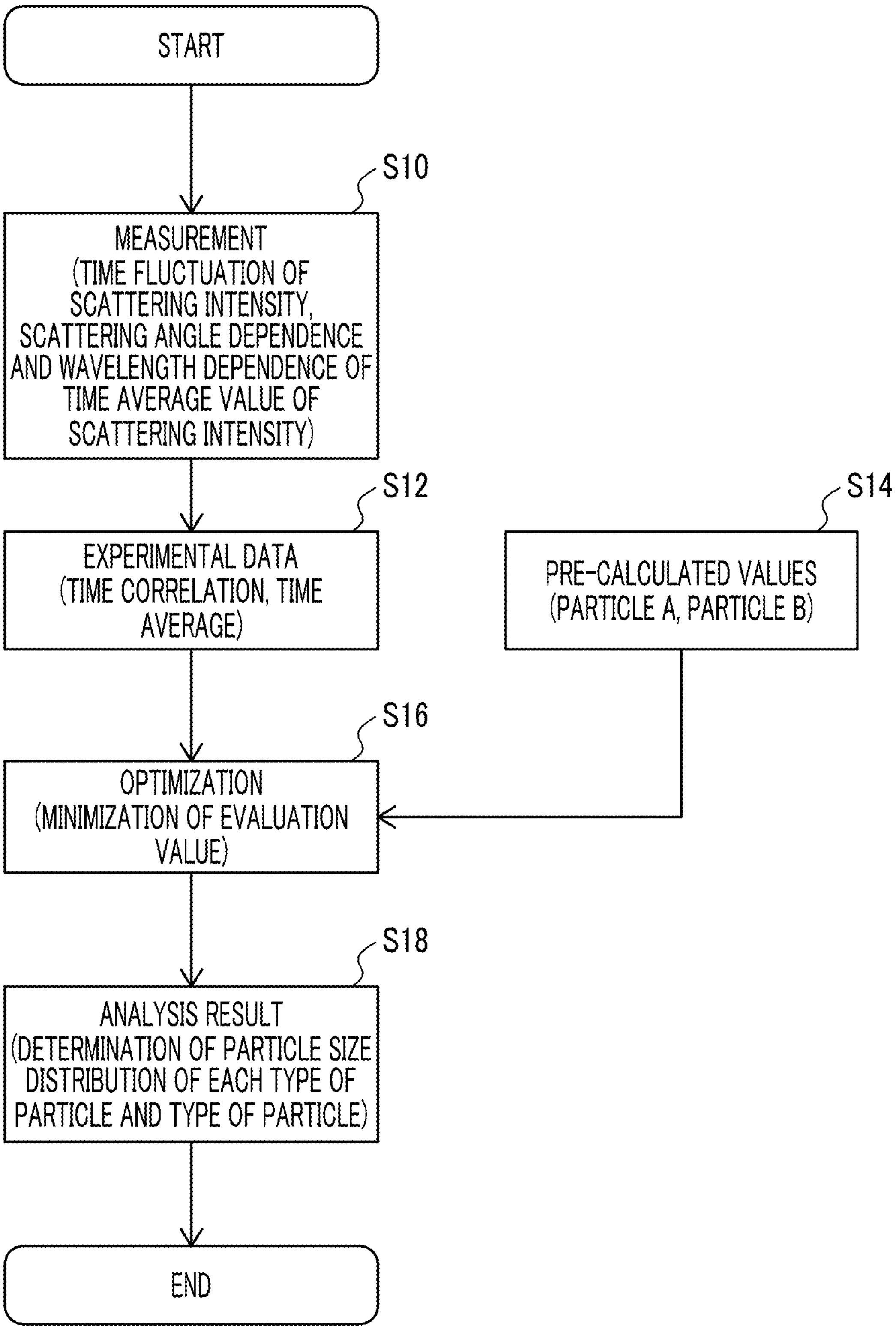
FIG. 5 is a flowchart illustrating a dynamic light scattering measurement method of the embodiment of the present invention.

Here, FIG. 5 is a flowchart showing a dynamic light scattering measurement method of the embodiment of the present invention.

As shown in FIG. 5, the dynamic light scattering measurement method has, for example, a measurement step (Step S10), a step of obtaining experimental data (Step S12), a step of obtaining pre-calculated values (Step S14), and an optimization step (Step S16). Through the optimization step (Step S16), an analysis result, that is, the particle size distribution of each type of particle of a plurality of types of particles is obtained (Step S18).

In the measurement step (Step S10), for example, the time fluctuation of the scattering intensity and scattering angle dependence or wavelength dependence of a time average value of the scattering intensity are measured.

In the step of obtaining experimental data (Step S12), for example, a time correlation with respect to the time fluctuation of the scattering intensity is obtained based on measured values of the measurement step (Step S10). A time average value of the scattering intensity of the scattering angle dependence or wavelength dependence of the time average value of the scattering intensity is obtained. With this, for example, the scattering intensity per scattering angle shown in FIG. 2 is obtained.

In the step of obtaining pre-calculated values (Step S14), for example, a calculated value of the scattering intensity is obtained using the theoretical formula that defines the relationship between the particle diameter and the scattering intensity or a simulation. The scattering intensity time variation characteristic data of the measurement parameters and the scattering intensity parameter-dependent data of the measurement parameters calculated by the theoretical formula that defines the relationship between the particle diameter and the scattering intensity are obtained. Alternatively, the scattering intensity time variation characteristic data of the measurement parameters and the scattering intensity parameter-dependent data of the measurement parameters calculated by the simulation are obtained.

In Step S14, for example, the scattering intensity parameter-dependent data is obtained based on at least one of a Mie scattering theoretical formula, a discrete dipole approximation method (DDA method), or a Stokes-Einstein's theoretical formula. In addition to such a method, the numerical calculated values of the scattering intensity and the scattering intensity parameter-dependent data may be obtained using a finite-difference time-domain (FDTD) method that is a known numerical calculation method. In Step S14, a measured value of the scattering intensity using known particles, such as standard particles, may be obtained. The pre-calculated values obtained in Step S14 are used in specifying the particle or the type of particle. For example, an aggregation state of the particles or the type of particle can also be determined by comparing the measured values obtained in Step S10 with the scattering characteristics of the particles of Step S14.

In the optimization step (Step S16), for example, the autocorrelation function and the theoretical formula of the scattering intensity are fitted to the time correlation of the time fluctuation of the scattering intensity and the time average value of the scattering intensity obtained in Step S12. In Step S16, in regard to particle numbers with respect to all particle diameters, an initial value is set, and then, is updated such that an evaluation value is minimized, and a final particle number is obtained.

Hereinafter, the dynamic light scattering measurement method will be more specifically described in detail, including the fitting.

(First Example of Dynamic Light Scattering Measurement Method)

In the dynamic light scattering measurement method, in measuring the scattering intensity of the dispersion liquid, there are the scattering angle and the measurement wavelength as the measurement parameters. In a first example of the dynamic light scattering measurement method, the measurement parameter is the scattering angle, and the scattering intensity of the dispersion liquid is measured while changing the scattering angle.

First, for example, the dispersion liquid Lq is irradiated with the laser light having a wavelength of 633 nm from the second light source unit 22 shown in FIG. 1. Scattered light scattered from the dispersion liquid Lq is detected by the light detection unit 34 at a predetermined scattering angle for a predetermined time. With this, the scattering intensity of the dispersion liquid Lq at the scattering angle can be obtained.

Next, the rotation unit 36 rotates the scattered light measurement unit 14 to change the scattering angle θ, and the scattering intensity of the dispersion liquid Lq is obtained. The change of the scattering angle and the measurement of the scattering intensity of the dispersion liquid Lq are repeatedly performed, and the scattering intensity of the dispersion liquid Lq is measured a plurality of times. The scattering intensity is measured while changing the scattering angle, for example, by 10°. The above step is the measurement step, and corresponds to Step S10 described above.

Next, the calculation unit 18 calculates the scattering intensity time variation characteristic data from the time dependence of the scattering intensity of the dispersion liquid Lq obtained by the measurement step. The scattering intensity time variation characteristic data is an autocorrelation function or a power spectrum.

The autocorrelation function is calculated from the scattering intensity of the dispersion liquid using a known method. The power spectrum is also calculated from the scattering intensity of the dispersion liquid using a known method.

In this manner, the scattering intensity time variation characteristic data is obtained for each scattering angle. That is, there are a plurality of pieces of time variation data.

Next, the calculation unit 18 calculates the scattering intensity parameter-dependent data from the scattering intensity of the dispersion liquid obtained by the measurement step.

The scattering intensity parameter-dependent data of the dispersion liquid is obtained, for example, by calculating the time average value of the scattering intensity of the dispersion liquid for each scattering angle. With this, data of the scattering intensity per scattering angle is obtained as shown in FIG. 2.

The above step of calculating the scattering intensity time variation characteristic data of the dispersion liquid and the scattering intensity parameter-dependent data of the dispersion liquid is the calculation step, and corresponds to Step S12 described above.

Next, the calculation unit 18 fits the scattering intensity time variation characteristic data of a plurality of scattering angles and the scattering intensity parameter-dependent data of a plurality of scattering angles to the theoretical formula that defines the relationship between the particle diameter and the scattering intensity. The particle size distribution of each type of particle of a plurality of types of particles is obtained by the above-described fitting. This corresponds to Steps S16 and S18 described above.

Specifically, for example, a case where there are two types of particles in the dispersion liquid will be described as an example.

A linear autocorrelation function is represented by $g^{(1)}(\tau)=\exp(-Dq^2\tau)$. In regard to a relationship between a diffusion coefficient obtained from the autocorrelation function and a particle size, a Stokes-Einstein's formula that is used in a normal dynamic light scattering method is applied.

In a case where two types of particles are in the dispersion liquid, the linear autocorrelation function is represented by Expression (1) described below. The scattering intensity is represented by Expression (2) described below. Expressions (1) and (2) described below are theoretical formulas, and $I_{total}$ in Expressions (1) and (2) is calculated values. $I_d^{single}$ and $I_d^{floc}$ are theoretical values, and the pre-calculated values obtained in Step S14 described above can be used.

In Expressions (1) and (2) described below, $g^{(1)}$ indicates the linear autocorrelation function. $I_{total}$ indicates a total scattering intensity. d indicates a particle diameter. A subscript 0 to M of d indicates an ordinal number of bins of a histogram shown in FIGS. 6 and 7. N indicates a particle number. A subscript d of N represents dependence on the particle diameter d. The bins of the histogram are data sections, and are represented by bars in the histogram.

A superscript single of the particle number N represents a particle number of the single particle of FIG. 3, and a superscript floc represents a particle number of the aggregate of FIG. 4.

D indicates a diffusion coefficient. A subscript d of the diffusion coefficient D represents dependence on the particle diameter d. q indicates a scattering vector. τ indicates a time lag of the linear autocorrelation function. θ indicates a scattering angle. I indicates a scattering intensity. A subscript d of the scattering intensity I represents dependence on the particle diameter d. A superscript single of the scattering intensity I represents a scattering intensity based on a model of the single particle of FIG. 3, and a superscript floc represents a scattering intensity based on a model of the aggregate of FIG. 4.

$$g^{(1)}(\tau) = \sum_{d=d_0}^{d_M} \frac{N_d^{single} I_d^{single}}{I_{total}} \exp(-D_d q^2 \tau) + \sum_{d=d_0}^{d_M} \frac{N_d^{floc} I_d^{floc}}{I_{total}} \exp(-D_d q^2 \tau) \quad (1)$$

Figure 6:
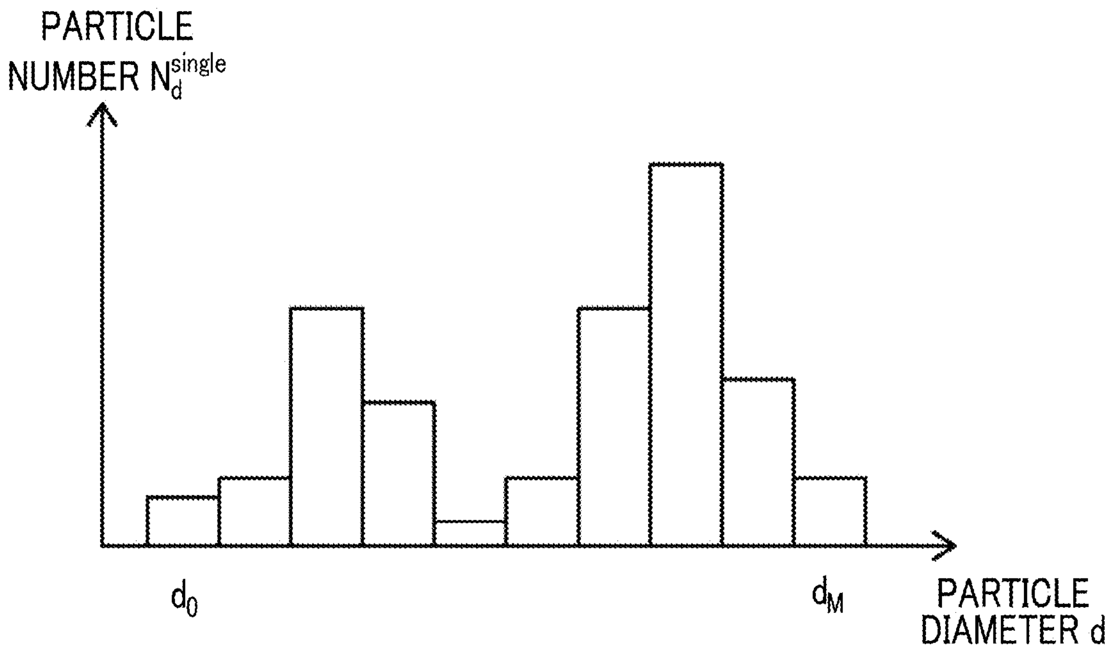
FIG. 6 is a histogram of the single particle.

In Expression (1) described above, the following term corresponds to a single particle, and corresponds to a histogram of a single particles shown in FIG. 6. In the following term, $\exp(-Dq^2\tau)$ is the linear autocorrelation function corresponding to the particle diameter d, and the other portion $N_d^{single} I_d^{single} / I_{total}$ indicates a ratio of the scattering intensity of all single particles belonging to the bins of the particle diameter d to the total scattering intensity. That is, the following term is a weight of the single particles. $I_{total}$ in Expression (1) is a theoretical value that is determined by the particle diameter.

$$\frac{N_d^{single} I_d^{single}}{I_{total}} \exp(-D_d q^2 \tau)$$

Figure 7:
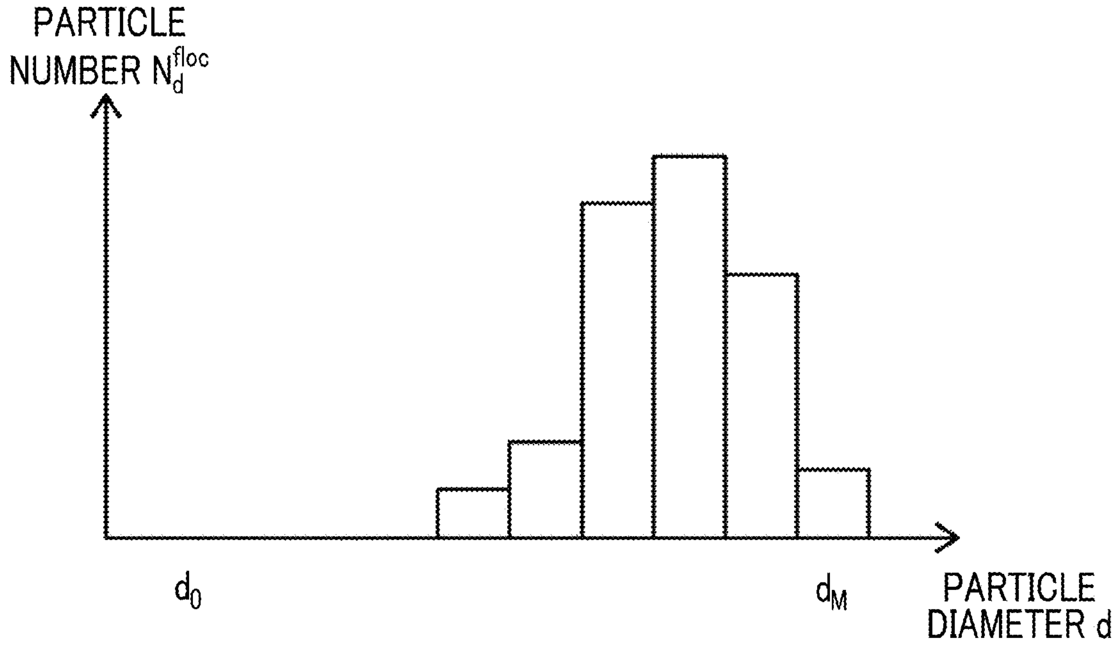
FIG. 7 is a histogram of an aggregate having cross-linked and aggregated particles.

In Expression (1) described above, the following term corresponds to the aggregate having cross-linked and aggregated particles, and corresponds to a histogram of an aggregate shown in FIG. 7. In the following term, $\exp(-Dq^2\tau)$ is the linear autocorrelation function, and the other portion $N_d^{floc} I_d^{floc} / I_{total}$ indicates a ratio of the scattering intensity of all aggregates belonging to the bins of the particle diameter d, to the total scattering intensity. That is, the following term is a weight of the aggregate.

$$\frac{N_d^{floc} I_d^{floc}}{I_{total}} \exp(-D_d q^2 \tau)$$

$$I_{total} = \sum_{d=d_0}^{d_M} N_d^{single} I_d^{single} + \sum_{d=d_0}^{d_M} N_d^{floc} I_d^{floc} \quad (2)$$

In Expression (2) described above, $N_d^{single} I_d^{single}$ corresponds to the scattering intensity of all single particles belonging to the bins of the particle diameter d, and $N_d^{floc} I_d^{floc}$ corresponds to the scattering intensity of all aggregates having cross-linked and aggregated particles belonging to the bins of the particle diameter d.

First Example of Fitting

Hereinafter, the fitting for obtaining the particle size distribution of each type of particle of a plurality of types of particles will be described. In the fitting, the particle number per particle diameter is finally obtained with the particle number per particle diameter as a variable.

A secondary autocorrelation function $g^{(2)}(\tau)$ is measured for each scattering angle, and there are a plurality of secondary autocorrelation functions.

In the fitting, in regard to the linear autocorrelation function per scattering angle, an initial particle number is set with the particle number as a variable in Expression (1). A calculated value of the linear autocorrelation function of Expression (1) based on the set initial particle number is obtained. A calculated value of the secondary autocorrelation function $g^{(2)}(\tau)=1+\beta\cdot|g^{(1)}(\tau)|^2$ is obtained from the calculated value of the linear autocorrelation function. $\beta$ is a device constant.

A difference between the measured value of the secondary autocorrelation function and the calculated value of the secondary autocorrelation function is obtained for each scattering angle. The difference between the measured value of the secondary autocorrelation function and the calculated value of the secondary autocorrelation function is referred to as a difference in secondary autocorrelation function. The difference in secondary autocorrelation function is obtained for each scattering angle. The calculated value of the secondary autocorrelation function per scattering angle corresponds to the scattering intensity time variation characteristic data of the measurement parameter calculated by the theoretical formula.

The total scattering intensity $I_{total}$ is measured for each scattering angle. In Expression (2), a value of the total scattering intensity $I_{total}$ of Expression (2) based on the set initial particle number is obtained.

A difference between the measured value of the total scattering intensity $I_{total}$ shown in FIG. 2 and the calculated value of the total scattering intensity $I_{total}$ of Expression (2) is obtained for each scattering angle. The difference between the measured value of the total scattering intensity $I_{total}$ and the calculated value of the total scattering intensity $I_{total}$ of Expression (2) at any scattering angle is referred to as a difference in total scattering intensity $I_{total}$ at the scattering angle. In regard to the total scattering intensity $I_{total}$, the difference in total scattering intensity $I_{total}$ at the scattering angle is obtained. The calculated value of the total scattering intensity $I_{total}$ of Expression (2) corresponds to the scattering intensity parameter-dependent data of the measurement parameter calculated by the theoretical formula.

In the fitting, to obtain the final particle number, the difference in secondary autocorrelation function obtained for each scattering angle described above and the difference in total scattering intensity at the scattering angle are used. For example, an evaluation value obtained by adding a value of the square of the difference in secondary autocorrelation function obtained for each scattering angle and a value of the square of the difference in total scattering intensity at the scattering angle for all scattering angles is used. The particle number with which the evaluation value is minimized is set as the final particle number.

For this reason, in the fitting, the particle number is repeatedly updated in Expressions (1) and (2) such that the evaluation value is minimized, to obtain the final particle number. This corresponds to Step S16 described above.

In regard to the particle numbers with respect to all particle diameters, an initial value is set, and then, is updated such that the evaluation value is minimized. For example, the histogram of the single particle shown in FIG. 6 and the histogram of the aggregate having cross-linked and aggregated particles shown in FIG. 7 can be obtained. That is, $N_d^{single}$ and $N_d^{floc}$ are obtained for all $d=d_0$ to $d_M$, whereby the particle size distribution can be obtained. This corresponds to Step S18 described above. The particle size distribution is a distribution of the number of particles with respect to the particle diameter, and for example, is in units of %.

The above step is a step of obtaining the particle size distribution of each type of particle of a plurality of types of particles. The evaluation value that is used for the fitting is not limited to the value described above.

As described above, Expressions (1) and (2) as two theoretical formulas are fitted to the measured secondary autocorrelation function and the measured total scattering intensity $I_{total}$ to obtain the final particle number. Note that an optimization method of the fitting is not limited to the method described above, and for example, Bayesian optimization can be used for the fitting.

While the secondary autocorrelation function is used in obtaining the particle number as described above, the present invention is not limited thereto, and a power spectrum may be used in place of the secondary autocorrelation function. In a case of measuring the linear autocorrelation function through heterodyne detection, the linear autocorrelation function may be used.

As described above, the autocorrelation function or the power spectrum of the scattering intensity and the scattering intensity per scattering angle are fitted to the theoretical formulas, whereby the particle number and the particle size distribution of each of the single particle and the aggregate can be obtained. In a case where an impurity component is included in the dispersion liquid, since the impurity component and the particle size distribution of each type of particle can be obtained, an influence of the impurity component can be separated. For the fitting, in addition to the theoretical formulas, the scattering intensity time variation characteristic data of the measurement parameter and the scattering intensity parameter-dependent data of the measurement parameter calculated by the simulation can also be used.

Second Example of Dynamic Light Scattering Measurement Method

In the dynamic light scattering measurement method, in a case where the measurement parameter is the measurement wavelength, the scattering intensity of the dispersion liquid is measured while changing the measurement wavelength.

A second example of the dynamic light scattering measurement method is different from the first example of the dynamic light scattering measurement method described above in that the measurement parameter is the measurement wavelength, the scattering angle θ (see FIG. 1) is fixed, and there is one scattering angle.

Figure 8:
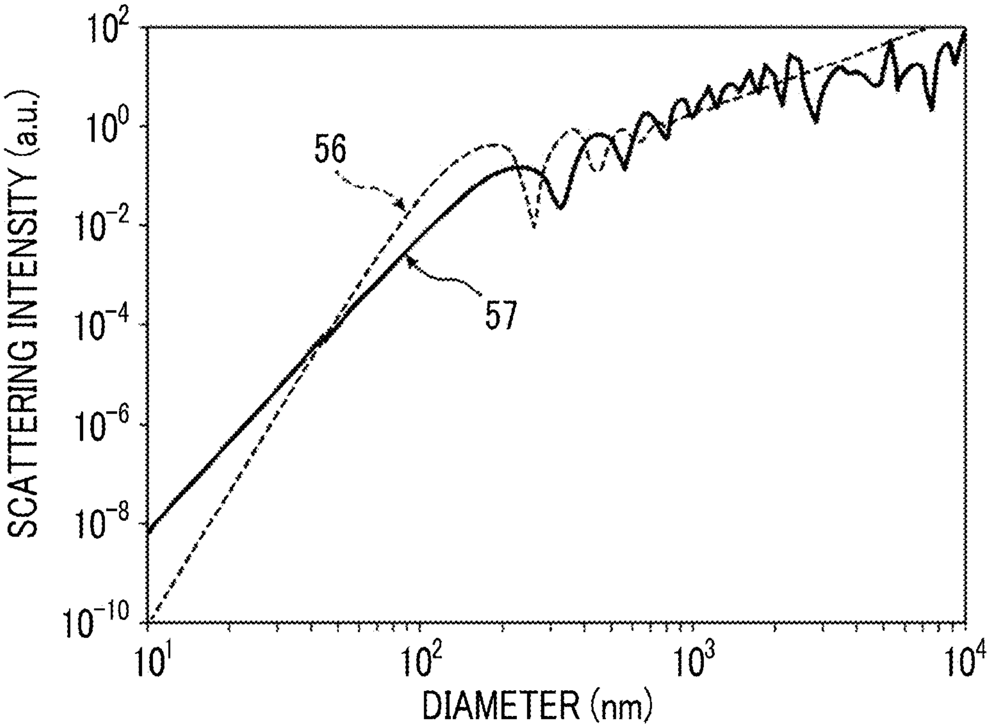
FIG. 8 is a graph showing an example of a relationship between a scattering intensity and a measurement wavelength.
Figure 9:
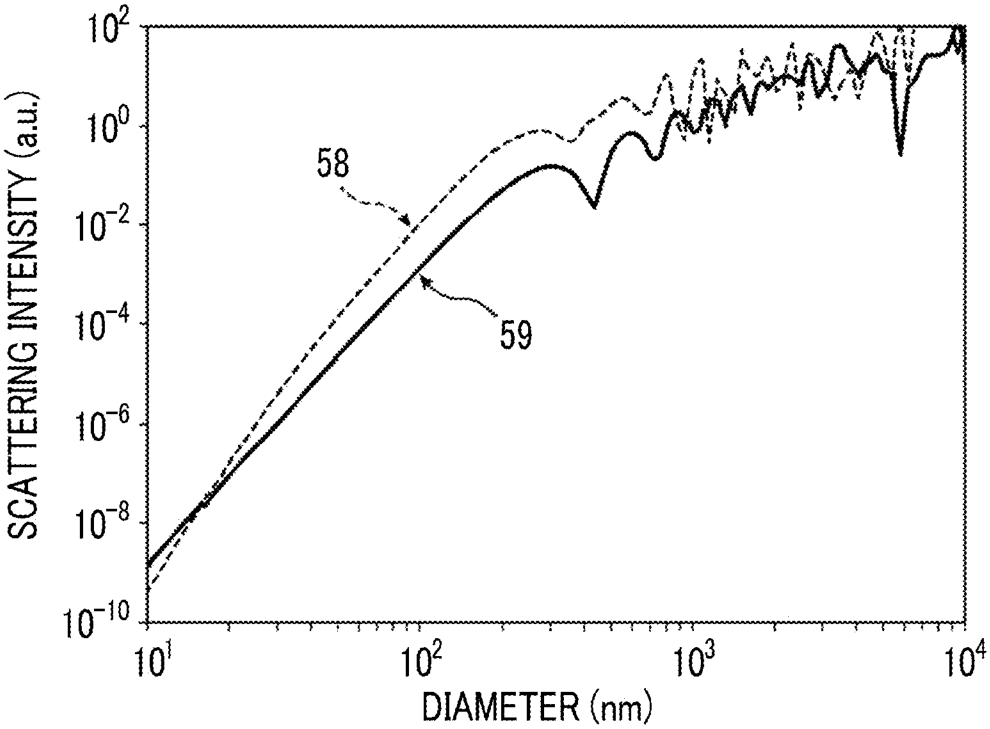
FIG. 9 is a graph showing another example of a relationship between a scattering intensity and a measurement wavelength.

Here, FIGS. 8 and 9 show a relationship between a scattering intensity and a measurement wavelength. FIG. 8 shows scattering intensities of two types of particles calculated at a measurement wavelength of 488 nm. As shown in FIG. 8, a profile 56 of a scattering intensity of a particle A and a profile 57 of a scattering intensity of a particle B are different.

FIG. 9 shows scattering intensities of two types of particles calculated at a measurement wavelength of 632.8 nm. As shown in FIG. 9, a profile 58 of a scattering intensity of the particle A and a profile 59 of a scattering intensity of the particle B are different. As shown in FIGS. 8 and 9, the scattering intensity with respect to the measurement wavelength is different depending on a difference in type of particle. From this, a particle number is obtained.

The particle A is a PY74 (C.I. PIGMENT YELLOW 74) particle, and the particle B is a polystyrene particle.

In the second example of the dynamic light scattering measurement method, the measurement parameter is the measurement wavelength, and the scattering intensity of the dispersion liquid is measured while changing the measurement wavelength.

First, the dispersion liquid Lq is irradiated with, for example, laser light having a wavelength of 488 nm from the first light source unit 20 shown in FIG. 1. Scattered light scattered from the dispersion liquid Lq is detected by the light detection unit 34, for example, at the scattering angle of 90° for a predetermined time. With this, the scattering intensity of the dispersion liquid Lq based on laser light of the first light source unit 20 can be obtained.

Next, the dispersion liquid Lq is irradiated with, for example, laser light having a wavelength of 633 nm from the second light source unit 22. Scattered light scattered from the dispersion liquid Lq is detected by the light detection unit 34, for example, at the scattering angle of 90° for a predetermined time. With this, the scattering intensity of the dispersion liquid based on laser light of the second light source unit 22 can be obtained. The above step is the measurement step. For example, laser light from the first light source unit 20 has the wavelength of 488 nm, laser light from the second light source unit 22 has the wavelength of 633 nm, and the measurement wavelengths are different.

Next, the scattering intensity time variation characteristic data is calculated from the time dependence of the scattering intensity of the dispersion liquid obtained by the measurement step. The scattering intensity time variation characteristic data is an autocorrelation function or a power spectrum. In this manner, the scattering intensity time variation characteristic data per wavelength is obtained.

Next, the scattering intensity parameter-dependent data is calculated from the scattering intensity of the dispersion liquid obtained by the measurement step.

The scattering intensity parameter-dependent data of the dispersion liquid is obtained, for example, by calculating a time average value of the scattering intensity of the dispersion liquid for each laser light wavelength. With this, data of the scattering intensity per measurement wavelength is obtained.

The above step of calculating the scattering intensity time variation characteristic data of the dispersion liquid and the scattering intensity parameter-dependent data of the dispersion liquid is the calculation step, and corresponds to Step S12 described above.

Next, the scattering intensity time variation characteristic data of a plurality of scattering angles and the scattering intensity parameter-dependent data of a plurality of scattering angles are fitted using the theoretical formula. The particle size distribution of each type of particle of a plurality of types of particles is obtained by the above-described fitting. This corresponds to Steps S16 and S18 described above.

In a case where the two types of particles of the particle A and the particle B are in the dispersion liquid, the linear autocorrelation function is represented by Expression (3) described below. The scattering intensity is represented by Expression (4) described below. Expressions (3) and (4) described below are theoretical formulas, and $I_{total}$ in Expressions (3) and (4) is a calculated value. $I_d^A$ and $I_d^B$ are theoretical values, and the pre-calculated values obtained in Step S14 described above can be used.

Expression (3) described below is basically the same as Expression (1) of the first example of the dynamic light scattering measurement method, and Expression (4) described below is basically the same as Expression (2) of the first example of the dynamic light scattering measurement method. In Expressions (3) and (4) described below, superscripts A and B represent that scattering intensity wavelength dependency corresponds to the particle A and the particle B.

$$g^{(1)}(\tau)=\sum_{d=d_0}^{d_M}\frac{N_d^A I_d^A}{I_{total}}\exp(-D_d q^2\tau)+\sum_{d=d_0}^{d_M}\frac{N_d^B I_d^B}{I_{total}}\exp(-D_d q^2\tau) \quad (3)$$

Figure 10:
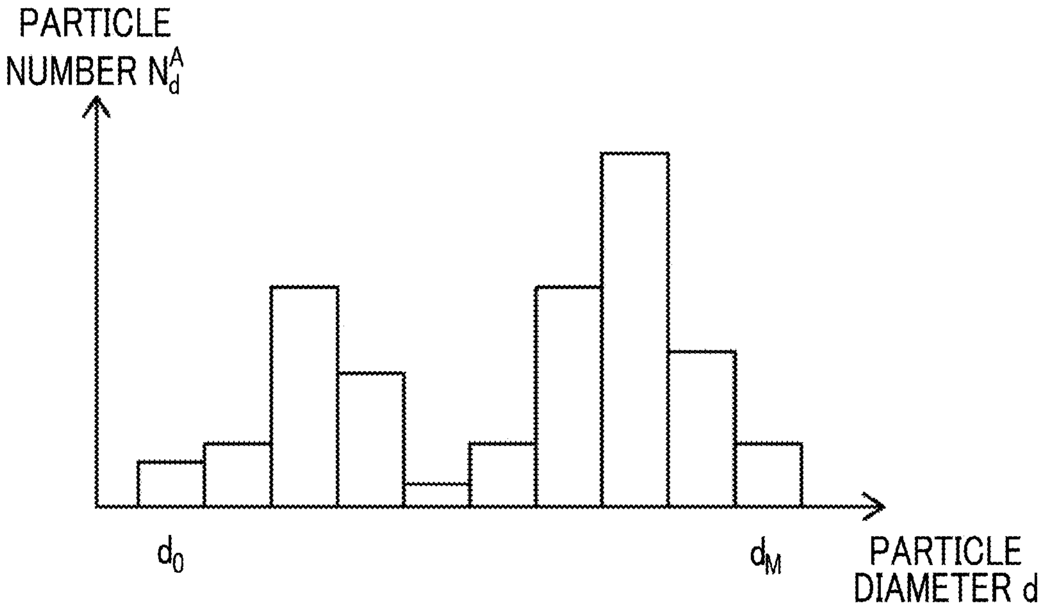
FIG. 10 is a histogram of a particle A.

In Expression (3) described above, the following term corresponds to the particle A, and corresponds to a histogram of the particle A shown in FIG. 10. In the following term, $\exp(-Dq^2\tau)$ is the linear autocorrelation function, and the other portion $N_d^A I_d^A/I_{total}$ indicates a ratio of the scattering intensity of all particles A belonging to the bins of the particle diameter d to the total scattering intensity. That is, the following term is a weight of the particles A. $I_{total}$ in Expression (3) is a theoretical value that is determined by the particle diameter. A Mie scattering theoretical formula can be used as the theoretical value.

$$\frac{N_d^A I_d^A}{I_{total}}\exp(-D_d q^2\tau)$$

Figure 11:
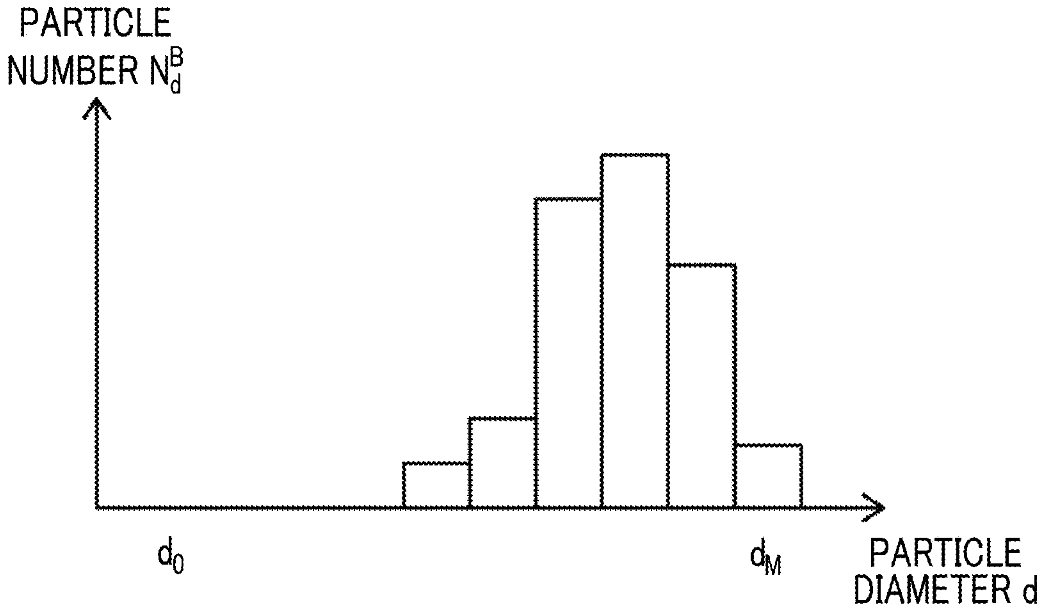
FIG. 11 is a histogram of a particle B.

In Expression (3) described above, the following term corresponds to the particle B, and corresponds to a histogram of the particle B shown in FIG. 11. In the following term, $\exp(-Dq^2\tau)$ is the linear autocorrelation function, and the other portion $N_d^B I_d^B/I_{total}$ indicates a ratio of the scattering intensity of all particles B belonging to the bins of the particle diameter d to the total scattering intensity. That is, the following term is a weight of the particle B.

$$\frac{N_d^B I_d^B}{I_{total}}\exp(-D_d q^2\tau)$$

$$I_{total}=\sum_{d=d_0}^{d_M}N_d^A I_d^A+\sum_{d=d_0}^{d_M}N_d^B I_d^B \quad (4)$$

In Expression (4) described above, $N_d^A I_d^A$ corresponds to the scattering intensity of all particles A belonging to the bins of the particle diameter d, and $N_d^B I_d^B$ corresponds to the scattering intensity of all particles B belonging to the bins of the particle diameter d.

Second Example of Fitting

Hereinafter, the fitting for obtaining the particle size distribution of each type of particle of a plurality of types of particles will be described. In the fitting, the particle number per particle diameter is finally obtained with the particle number as a variable. A secondary autocorrelation function $g^{(2)}(\tau)$ is measured for each measurement wavelength, and there are a plurality of secondary autocorrelation functions.

In the fitting, in regard to the linear autocorrelation function per measurement wavelength, an initial particle number is set with the particle number as a variable in Expression (3). A calculated value of the linear autocorrelation function of Expression (3) based on the set initial particle number is obtained. A calculated value of the secondary autocorrelation function $g^{(2)}(\tau)=1+\beta\cdot|g^{(1)}(\tau)|^2$ is obtained from the calculated value of the linear autocorrelation function. $\beta$ is a device constant.

A difference between the measured value of the secondary autocorrelation function and the calculated value of the secondary autocorrelation function is obtained for each measurement wavelength. The difference between the measured value of the secondary autocorrelation function and the calculated value of the secondary autocorrelation function is referred to as a difference in secondary autocorrelation function. The difference in secondary autocorrelation function is obtained for each measurement wavelength. The calculated value of the secondary autocorrelation function per measurement wavelength corresponds to the scattering intensity time variation characteristic data of the measurement parameter calculated by the theoretical formula.

The total scattering intensity $I_{total}$ is measured for each measurement wavelength. In Expression (4), a value of the total scattering intensity $I_{total}$ of Expression (4) based on the set initial particle number is obtained.

A difference between the measured value of the total scattering intensity $I_{total}$ and the calculated value of the total scattering intensity $I_{total}$ of Expression (4) is obtained for each measurement wavelength. The difference between the measured value of the total scattering intensity $I_{total}$ and the calculated value of the total scattering intensity $I_{total}$ of Expression (4) at any measurement wavelength is referred to as a difference in total scattering intensity $I_{total}$ at the measurement wavelength. In regard to the total scattering intensity $I_{total}$, the difference in total scattering intensity $I_{total}$ at the measurement wavelength is obtained. The calculated value of the total scattering intensity $I_{total}$ of Expression (4) corresponds to the scattering intensity parameter-dependent data of the measurement parameter calculated by the theoretical formula.

As in the first example of the dynamic light scattering measurement method, in the fitting, to obtain the final particle number, the difference in secondary autocorrelation function obtained for each measurement wavelength described above and the difference in total scattering intensity at the measurement wavelength are used. For example, an evaluation value obtained by adding a value of the square of the difference in secondary autocorrelation function obtained for each measurement wavelength and a value of the square of the difference in total scattering intensity at the measurement wavelength for all measurement wavelengths is used. The particle number with which the evaluation value is minimized is set as the final particle number.

For this reason, in the fitting, the particle number is repeatedly updated in Expressions (3) and (4) such that the evaluation value is minimized, to obtain the final particle number. This corresponds to Step S16 described above.

In regard to the particle numbers with respect to all particle diameters, an initial value is set, and then, is updated such that the evaluation value is minimized. For example, the histogram of the particle A shown in FIG. 10 and the histogram of the particle B shown in FIG. 11 can be obtained. That is, $N_d^A$ and $N_d^B$ are obtained for all $d=d_0$ to $d_M$, whereby the particle size distribution can be obtained. This corresponds to Step S18 described above.

The above step is a step of obtaining the particle size distribution of each type of particle of a plurality of types of particles. The evaluation value that is used for the fitting is not limited to the value described above.

The type of particle in the dispersion liquid can also be determined by the calculation unit 18 using the difference in scattering intensity with respect to the measurement wavelength shown in FIG. 8 or 9. The particle size distribution of the determined particle can also be obtained. For this reason, the type of particle in the dispersion liquid may be known or may be unknown.

As in the first example of the dynamic light scattering measurement method, as described above, Expressions (3) and (4) as two theoretical formulas are fitted to the measured secondary autocorrelation function and the measured total scattering intensity $I_{total}$ to obtain the final particle number. Note that an optimization method of the fitting is not limited to the method described above, and for example, Bayesian optimization can be used for the fitting.

While the secondary autocorrelation function is used in obtaining the particle number as described above, the present invention is not limited thereto, and a power spectrum may be used in place of the linear autocorrelation function. In a case of measuring the linear autocorrelation function through heterodyne detection, the linear autocorrelation function may be used.

The autocorrelation function or the power spectrum of the scattering intensity and the scattering intensity per measurement wavelength are fitted to the theoretical formulas, whereby the particle number and the particle size distribution can be obtained for each type of particle, such as the particle A and the particle B. In a case where an impurity component is included in the dispersion liquid, since the impurity component and the particle size distribution of each type of particle can be obtained, an influence of the impurity component can be separated. For the fitting, in addition to the theoretical formulas, the scattering intensity time variation characteristic data of the measurement parameter and the scattering intensity parameter-dependent data of the measurement parameter calculated by the simulation can also be used.

Although an example where the number of measurement wavelengths is two has been described, the number of measurement wavelengths is not limited to two, and the number of measurement wavelengths may be three or four as long as the number of measurement wavelengths is plural.

Third Example of Dynamic Light Scattering Measurement Method

In the measurement step, a light intensity of a polarized component of scattered light of the dispersion liquid obtained by irradiating the dispersion liquid with incident light having specific polarization may be measured as a scattering intensity. The measurement step is executed by the scattered light measurement unit 14.

For example, the dispersion liquid Lq of the sample cell 16 is irradiated with circularly polarized laser light as incident light, and a polarized component of scattered light of the dispersion liquid Lq is measured. In regard to the light intensity of the polarized component of scattered light, for example, a difference between a light intensity of vertically linearly polarized light and a light intensity of horizontally linearly polarized light is measured as a scattering intensity. In this case, as in the first example of the above-described dynamic light scattering measurement method, in a case where measurement is performed while changing the scattering angle, a graph that shows a relationship between a scattering intensity and a scattering angle shown in FIG. 12 can be obtained.

Vertically linearly polarized light refers to that a direction of linearly polarized light is vertical in a case where a scattering surface is horizontal. Horizontally linearly polarized light refers to that a direction of linearly polarized light is horizontal in a case where the scattering surface is horizontal.

Figure 12:
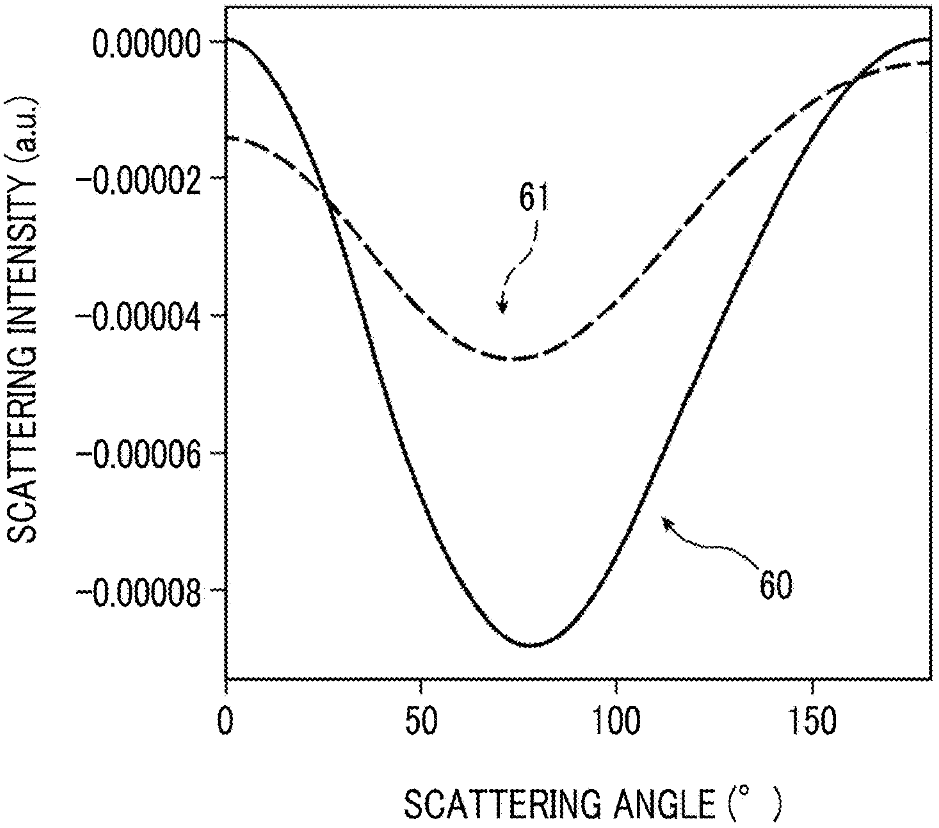
FIG. 12 is a graph showing a relationship between a scattering intensity and a scattering angle of each shape of particles obtained by a DDA method.
Figure 13:
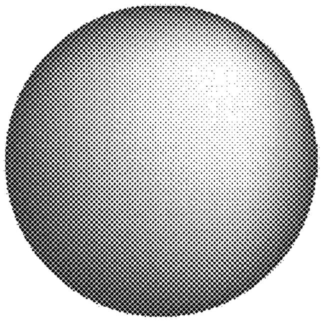
FIG. 13 is a schematic perspective view showing a spherical particle.
Figure 14:
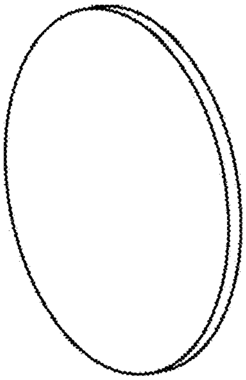
FIG. 14 is a schematic perspective view of a disc-shaped particle.

FIG. 12 is a graph showing a relationship between a scattering intensity and a scattering angle of each shape of particles obtained by a DDA method. FIG. 12 shows a relationship between a scattering intensity and a scattering angle in a spherical particle shown in FIG. 13 and a disc-shaped particle shown in FIG. 14. As shown in FIG. 12, a profile 60 of a scattering intensity of the spherical particle and a profile 61 of a scattering intensity of the disc-shaped particle are different.

In this way, change of the scattering intensity with respect to the scattering angle is different depending on the shape of the particle. That is, for example, the profile of the scattering intensity obtained while changing the scattering angle as the value of the measurement parameter is different for each of a plurality of types of particles. From the difference in the profile of the scattering intensity, a difference in shape of the particle can be determined by measuring the polarized component of scattered light using polarized laser light as incident light.

In the third example of the dynamic light scattering measurement method, the polarized component of scattered light is measured using polarized laser light as incident light, and the particle size distribution of each type of particle of a plurality of types of particles in the dispersion liquid including a plurality of types of particles can be obtained in the same manner as in the first example of the dynamic light scattering measurement method described above.

In a case where the type of the particle in the dispersion liquid can be determined, the particle size distribution of each particle in the dispersion liquid can be obtained.

As described above, polarized light as incident light is incident on the dispersion liquid, the light intensity of the polarized component of scattered light is detected as the scattering intensity, and at least one of the scattering angle or the measurement wavelength described above is combined. Thereby, also in regard to particles having different shapes, the particle size distribution of each type of particle of a plurality of types of particles can be obtained. In a case where an impurity component is included in the dispersion liquid, an influence of the impurity component can be separated, and then, the particle size distribution of each type of particle of a plurality of types of particles can be obtained. For the fitting, in addition to the theoretical formulas, the scattering intensity time variation characteristic data of the measurement parameter and the scattering intensity parameter-dependent data of the measurement parameter calculated by the simulation can also be used.

The type, for example, polarized light is used, and the shape of the particle in the dispersion liquid can be determined by the calculation unit 18 using the difference in scattering intensity with respect to the scattering angle shown in FIG. 12. The particle size distribution of the determined particle can also be obtained. For this reason, the shape of the particle in the dispersion liquid may be known or may be unknown.

In a case where polarized light is used as described above, and for example, in a case where the scattering angle is used as the measurement parameter, Expressions (1) and (2) described above can be used.

In a case where polarized light is used as described above, and for example, in a case where the measurement wavelength is used as the measurement parameter, Expressions (3) and (4) described above can be used.

The first example of the dynamic light scattering measurement method and the second example of the dynamic light scattering measurement method described above may be combined. That is, the particle size distribution of each type of particle of a plurality of types of particles can also be obtained using the scattering angle and the measurement wavelength described above as the measurement parameters. Also in this case, in a case where an impurity component is included in the dispersion liquid, since the impurity component and the particle size distribution of each type of particle can be obtained, an influence of the impurity component can be separated.

In the measurement step, at least one of scattering intensity parameter-dependent data obtained by successively irradiating the dispersion liquid with incident light having a plurality of polarization states or scattering intensity parameter-dependent data obtained by extracting a polarized component of scattered light emitted from the dispersion liquid a plurality of times may be measured. The measurement step is executed by the scattered light measurement unit 14 and the polarizing element 28.

The scattering intensity parameter-dependent data obtained by successively irradiating the dispersion liquid with incident light having a plurality of polarization states is obtained by bringing incident light into the polarization state. The scattering intensity parameter-dependent data obtained by extracting the polarized components of scattered light emitted from the dispersion liquid a plurality of times is obtained by detecting the polarized component of scattered light without bringing incident light into the polarization state. Data obtained by bringing incident light into the polarization state and detecting the polarized component of scattered light is included in the above-described scattering intensity parameter-dependent data.

Figure 15:
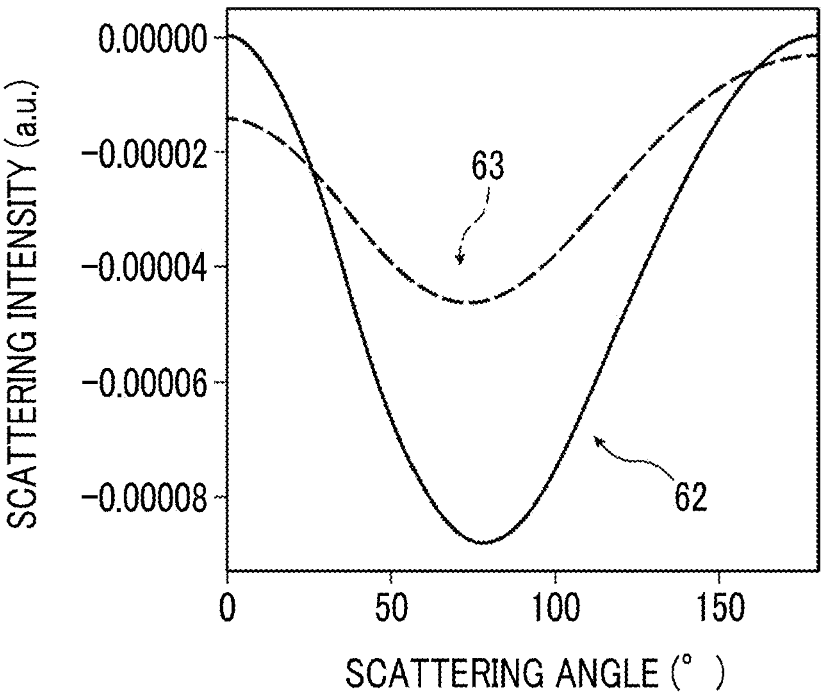
FIG. 15 is a graph showing an example of scattering intensity parameter-dependent data.

For example, in a case where the measurement parameter is the scattering angle, the polarization state of incident light is circularly polarized light, and the polarized component of scattered light is a difference between a vertically polarized light intensity and a horizontally polarized light intensity, scattering intensity parameter-dependent data shown in FIG. 15 is obtained. A profile 62 shown in FIG. 15 shows the spherical particle of FIG. 13, and a profile 63 shows the disc-shaped particle of FIG. 14.

Figure 16:
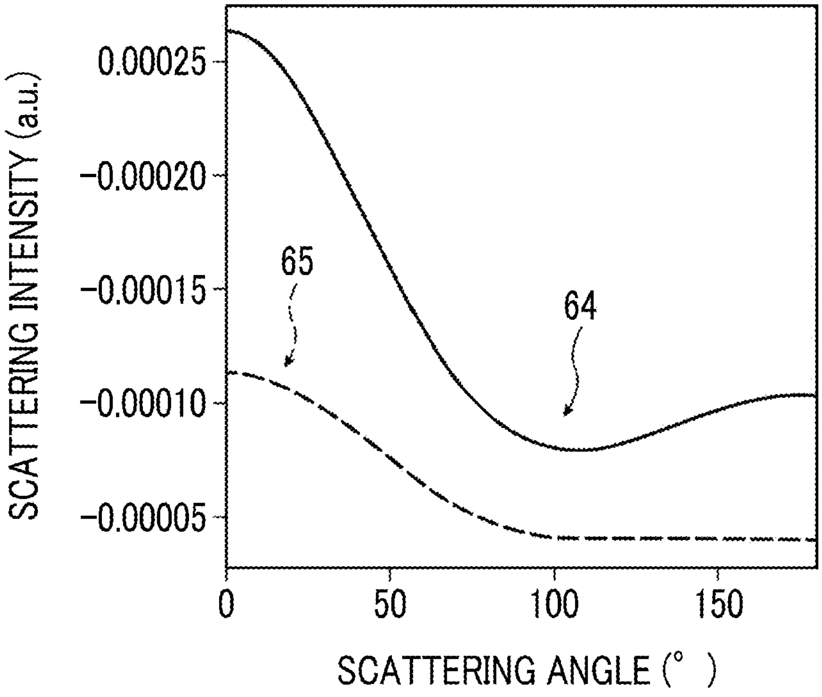
FIG. 16 is a graph showing another example of scattering intensity parameter-dependent data.

For example, in a case where the measurement parameter is the scattering angle, the polarization state of incident light is 45° linearly polarized light, and the polarized component of scattered light is a sum of a vertically polarized light intensity and a horizontally polarized light intensity, scattering intensity parameter-dependent data shown in FIG. 16 is obtained. A profile 64 shown in FIG. 16 shows the spherical particle of FIG. 13, and a profile 65 shows the disc-shaped particle of FIG. 14.

The scattering intensity parameter-dependent data shown in FIG. 15 may be used in the above-described fitting. The scattering intensity parameter-dependent data shown in FIG. 16 may be used in the above-described fitting. Both the scattering intensity parameter-dependent data shown in FIG. 15 and the scattering intensity parameter-dependent data shown in FIG. 16 may be used in the above-described fitting. In this way, fitting may be performed with scattering intensities in a plurality of incidence polarization states and a plurality of emission polarization states.

As shown in FIGS. 15 and 16, the scattering intensity parameter-dependent data obtained depending on the polarization state tends to be different. Fitting is performed using a difference in scattering intensity parameter-dependent data depending on the polarization state, whereby it is possible to determine the type, for example, the shape of the particle in the dispersion liquid with higher accuracy, and to obtain the particle size distribution of the determined particle.

Although both the scattering intensity parameter-dependent data shown in FIGS. 15 and 16 are obtained in a case where the measurement parameter is the scattering angle, the measurement parameter is not limited to the scattering angle, and may be the measurement wavelength.

In all of the first example of the dynamic light scattering measurement method, the second example of the dynamic light scattering measurement method, and the third example of the dynamic light scattering measurement method, in a case where it is unknown that a plurality of types of particles are included in the dispersion liquid including particles, a determination step of determining the type of particle in the dispersion liquid may be provided. Through the determination step, in a case where the types of particles in the dispersion liquid are determined, a step of obtaining the particle size distribution of each particle in the dispersion liquid may be executed. The determination step is executed by the calculation unit 18.

In the determination step, in the fitting using the above-described theoretical formula, in a case where the measurement parameter is the scattering angle, for example, a difference from a theoretical formula of a scattering intensity on an assumption of one type of particle is detected, and in a case where there is the difference, determination is made that there are a plurality of types of particles in the dispersion liquid.

In regard to the determination of the type of particle, for example, theoretical formulas of scattering intensities of a particle A, a particle B, a particle C, and the like are stored in a library (not shown) of the calculation unit 18 (see FIG. 1). The calculation unit 18 calls the theoretical formulas of the scattering intensities described above in the determination of the type of particle, tries fitting, and calculates a minimum value of an evaluation value through optimization. Determination is made that the type of particle for which the minimum value of the evaluation value is smallest is an actual correct type of particle.

In the determination step, in a case where the measurement parameter is the measurement wavelength, a difference in scattering intensity depending on the measurement wavelength may be detected, and in a case where there is the difference, determination may be made that there are a plurality of types of particles in the dispersion liquid.

In the determination step, polarized light may be used, a difference in scattering intensity depending on the scattering angle may be detected, and in a case where there is the difference, determination may be made that there are a plurality of types of particles having different shapes in the dispersion liquid.

In a plurality of types of particles, a plurality of types are aggregation structures, materials of particles, shapes of particles, and the like. A plurality of types of particles are the single particle, the aggregate having cross-linked and aggregated particles, the polystyrene particle, the spherical particle, the disc-shaped particle, and the like described above.

The present invention is basically configured as described above. Although the dynamic light scattering measurement method and the dynamic light scattering measurement device of the present invention have been described above in detail, the present invention is not limited to the above-described embodiment, and various improvements or alterations may be of course made without departing from the gist of the present invention.

Example 1

Hereinafter, the features of the present invention will be further specifically described with reference to an example. Any materials, reagents, mass of substances and their ratios, operations and so forth shown in Example below may appropriately be altered, without departing from the spirit of the present invention. Accordingly, the scope of the present invention is not limited to the following example.

In a first example, dynamic light scattering measurement of a dispersion liquid including particles is performed using the scattering angle as the measurement parameter. This is designated as Example 1. The following samples 1 to 4 are used as the dispersion liquid.

The sample 1 is a dispersion liquid in which pure water is used as a solvent and silica is used as particles.

The sample 2 is a dispersion liquid in which pure water is used as a solvent, silica is used as particles, and 0.3 mg/ml of polyvinylpyrrolidone (PVP molecular weight Mw=1300000) is further added.

The sample 3 is a dispersion liquid in which pure water is used as a solvent, silica is used as particles, and 1 mg/ml of PVP is further added.

The sample 4 is a dispersion liquid in which pure water is used as a solvent, silica is used as particles, and 10 mg/ml of PVP is further added.

A concentration of the particles of the samples 1 to 4 is 1.3% by volume.

With the addition of PVP, silica particles are aggregated, and in a case where an addition amount increases, the degree of aggregation of silica particles increases. In the samples 2 to 4, since PVP is added, silica particles are aggregated.

Figure 17:
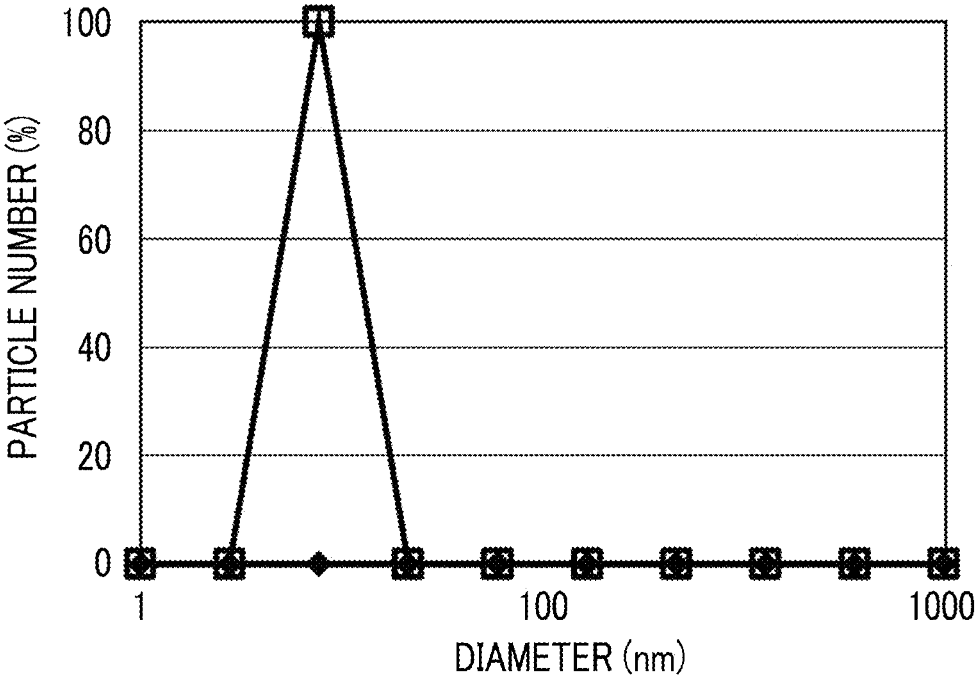
FIG. 17 is a graph showing a measurement result of sample 1 using the dynamic light scattering measurement method of the present invention.
Figure 18:
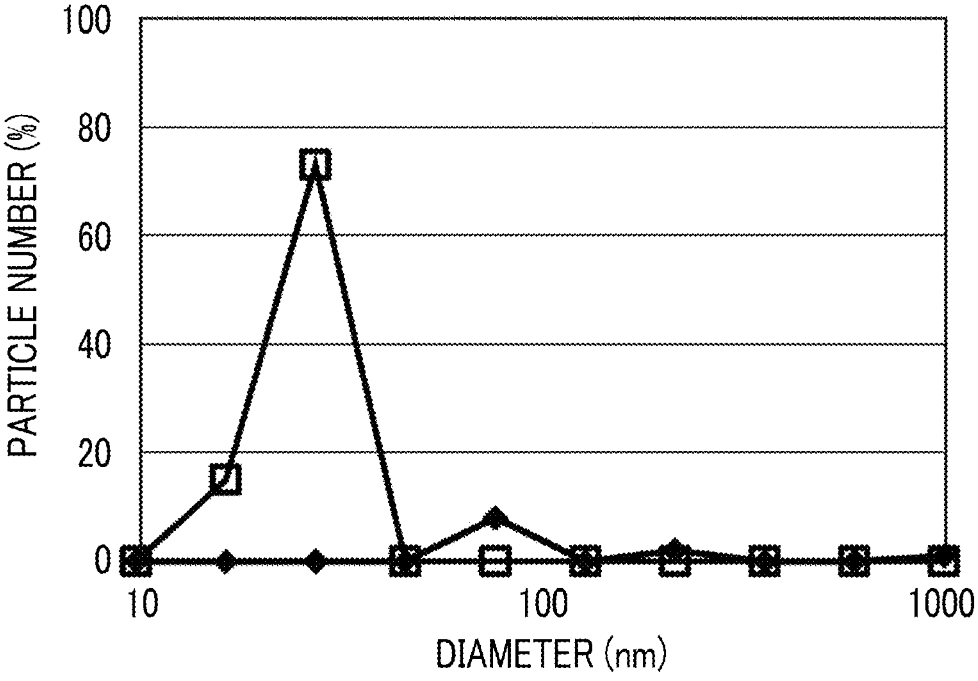
FIG. 18 is a graph showing a measurement result of sample 2 using the dynamic light scattering measurement method of the present invention.
Figure 19:
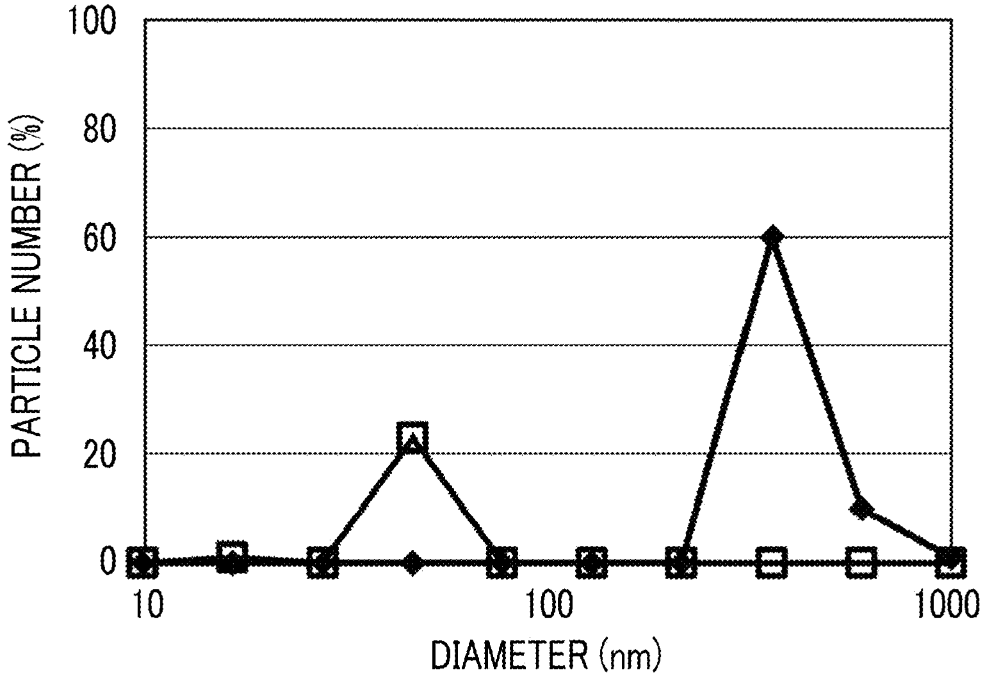
FIG. 19 is a graph showing a measurement result of sample 3 using the dynamic light scattering measurement method of the present invention.
Figure 20:
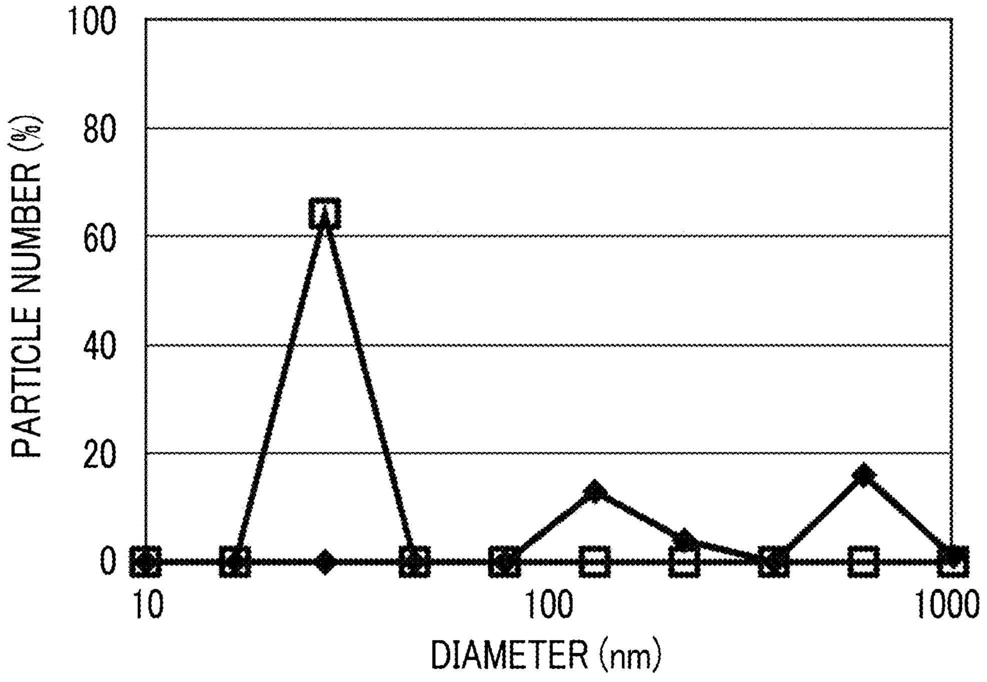
FIG. 20 is a graph showing a measurement result of sample 4 using the dynamic light scattering measurement method of the present invention.

In Example 1, a result of the sample 1 is shown in FIG. 17, a result of the sample 2 is shown in FIG. 18, a result of the sample 3 is shown in FIG. 19, and a result of the sample 4 is shown in FIG. 20. In FIGS. 17 to 20, □ indicates a single particle of silica, ♦ indicates a cross-linking aggregate.

As Comparative Example 1, dynamic light scattering measurement of the related art is performed. In the dynamic light scattering measurement of the related art, the scattering angle is set to 50°, 90°, and 150°. A scattered light intensity is measured at the scattering angle of 50°, 90°, and 150° to obtain an autocorrelation function, and a theoretical formula is fitted to the autocorrelation function to obtain a particle number.

Figure 21:
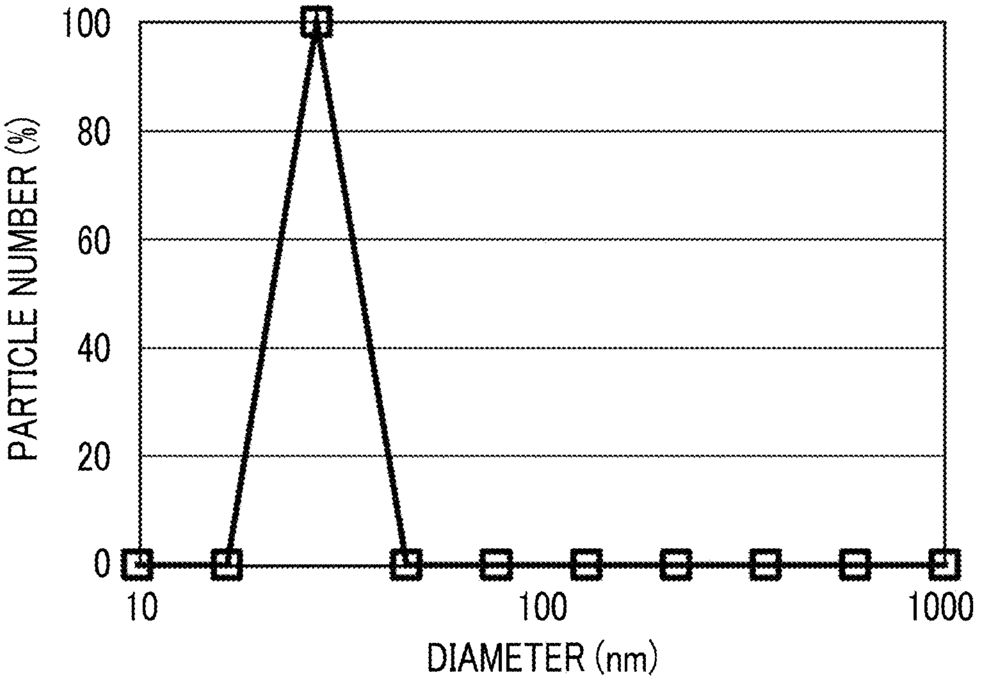
FIG. 21 is a graph showing a measurement result of sample 1 using a dynamic light scattering measurement method of the related art.
Figure 22:
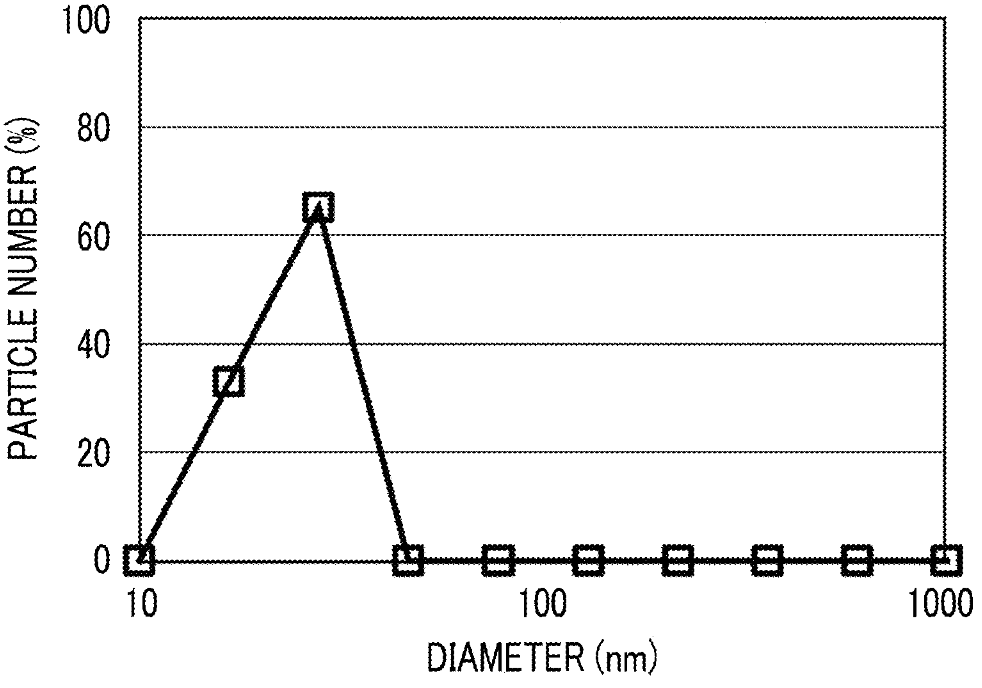
FIG. 22 is a graph showing a measurement result of sample 2 using the dynamic light scattering measurement method of the related art.
Figure 23:
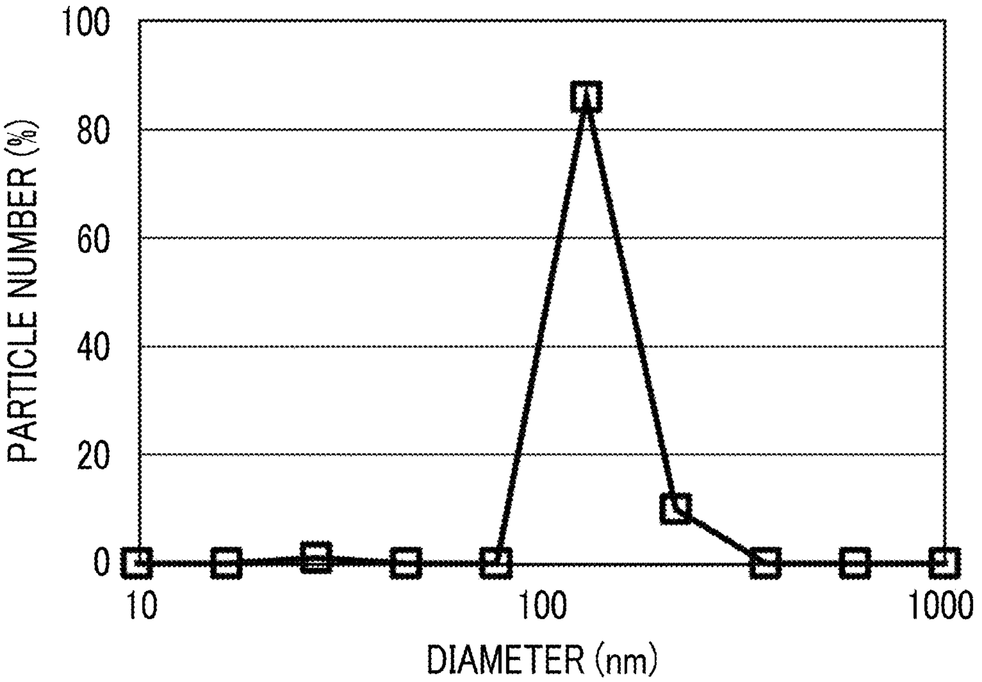
FIG. 23 is a graph showing a measurement result of sample 3 using the dynamic light scattering measurement method of the related art.
Figure 24:
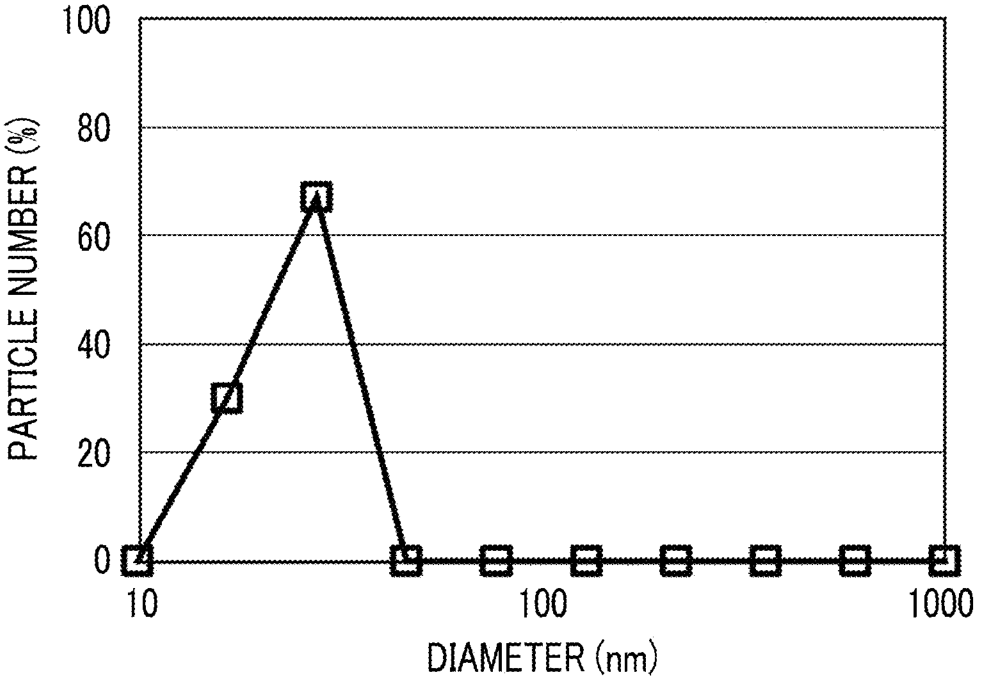
FIG. 24 is a graph showing a measurement result of sample 4 using the dynamic light scattering measurement method of the related art.

In Comparative Example 1, a result of the sample 1 is shown in FIG. 21, a result of the sample 2 is shown in FIG. 22, a result of the sample 3 is shown in FIG. 23, and a result of the sample 4 is shown in FIG. 24.

The particle number shown in FIGS. 21 to 24 is a particle number having a rheological diameter obtained only from dynamic light scattering.

In the sample 1, silica particles are not aggregated. In Example 1, as shown in FIG. 17, a result that the sample 1 is a single particle is obtained. On the other hand, in Comparative Example 1, as shown in FIG. 21, since it is not possible to discriminate whether each sample is any of a single particle and a cross-linking aggregate, and only the rheological diameter is shown.

In the samples 2 to 4, silica particles are aggregated. In Example 1, as shown in FIGS. 18 to 20, there are two distributions having different diameters, and one distribution corresponds to a single particle of silica. The remaining distribution corresponds to a cross-linking aggregate. On the other hand, in Comparative Example 1, as shown in FIGS. 22 to 24, there is one distribution, the generation of large particle, and generation of a large particle is ascertained; however, it is not possible to discriminate whether each sample is any of a single particle and a cross-linking aggregate. For this reason, only the rheological diameter is shown.

Example 2

In a second example, as Example 10, dynamic light scattering measurement of a dispersion liquid including particles is performed using the measurement wavelength as a measurement parameter. The measurement wavelength is set to 488 nm and 632.8 nm. The following samples 10 to 12 are used as the dispersion liquid.

The sample 10 is a dispersion liquid in which pure water is used as a solvent and PY74 (C.I. PIGMENT YELLOW 74) is used as particles. The particles have one type of particles. A concentration of the particles of the sample 10 is 0.00272% by mass.

The sample 11 is a dispersion liquid in which pure water is used as a solvent and polystyrene (PS) is used as particles. The particles have one type of particles. A concentration of the particles of the sample 11 is 0.0013% by mass.

The sample 12 is a dispersion liquid in which pure water is used as a solvent and PY74 and PS are used as particles. The particles have two types of particles. As concentrations of the particles of the sample 12, PY74 is 0.000068% by mass, and PS is 0.0013% by mass.

Figure 25:
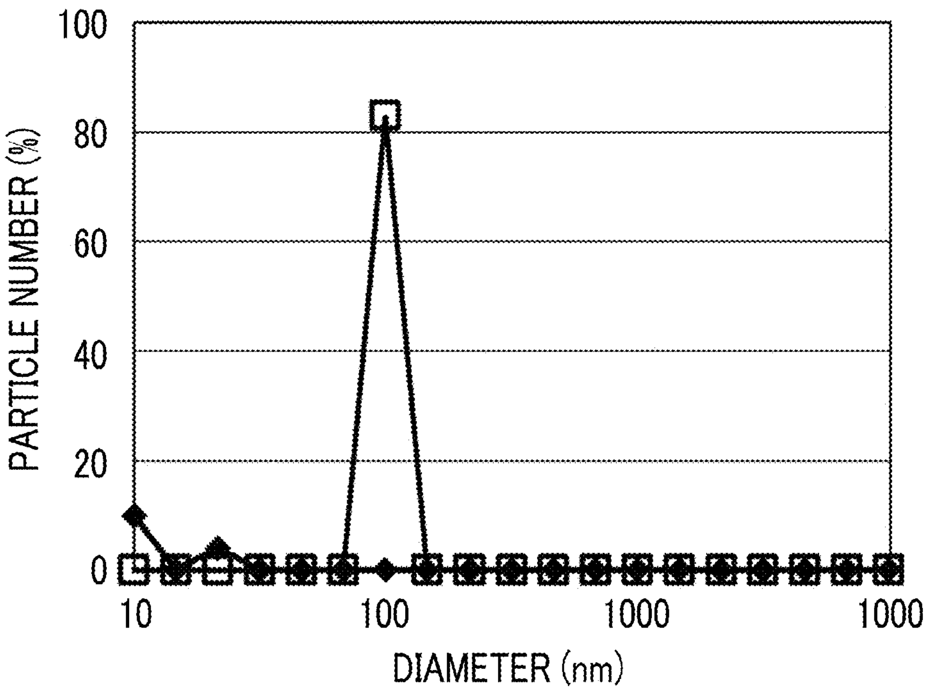
FIG. 25 is a graph showing a measurement result of sample 10 using the dynamic light scattering measurement method of the present invention.
Figure 26:
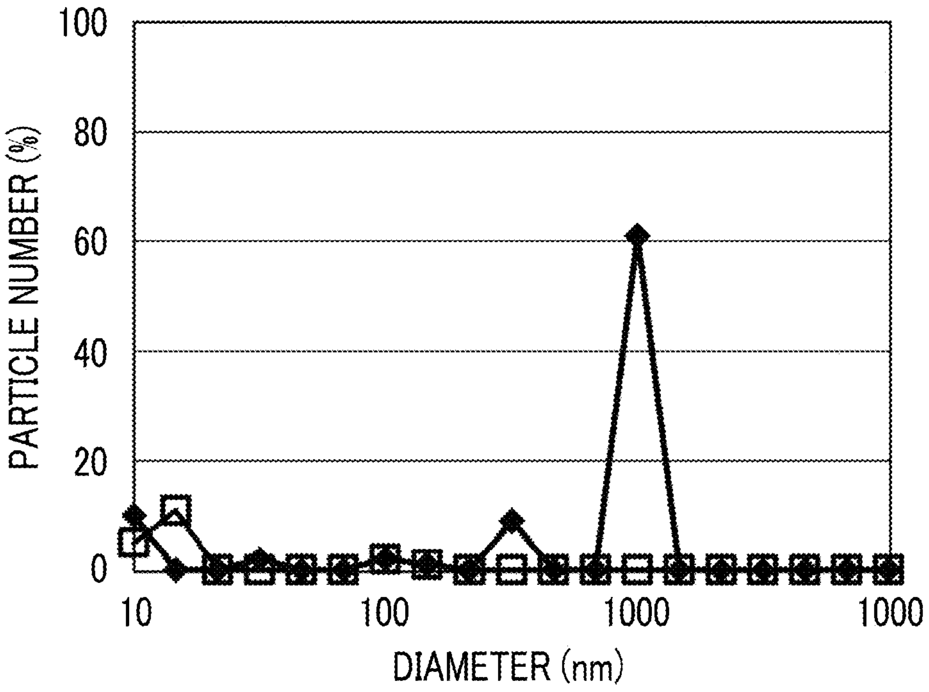
FIG. 26 is a graph showing a measurement result of sample 11 using the dynamic light scattering measurement method of the present invention.
Figure 27:
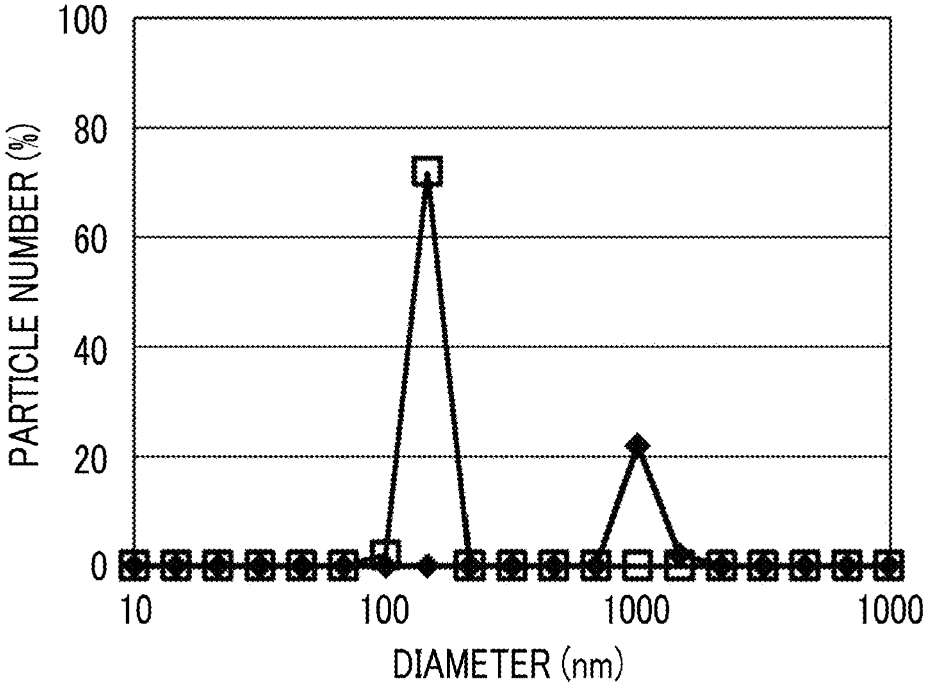
FIG. 27 is a graph showing a measurement result of sample 12 using the dynamic light scattering measurement method of the present invention.

In Example 10, a result of the sample 10 is shown in FIG. 25, a result of the sample 11 is shown in FIG. 26, and a result of the sample 12 is shown in FIG. 27.

As Comparative Example 10, dynamic light scattering measurement of the related art is performed. In the dynamic light scattering measurement of the related art, the measurement wavelength is set to 488 nm and 632.8 nm. A scattered light intensity is measured at each measurement wavelength to obtain an autocorrelation function, and a theoretical formula is fitted to the autocorrelation function to obtain a particle number. The samples 10 to 12 are used as the dispersion liquid.

Figure 28:
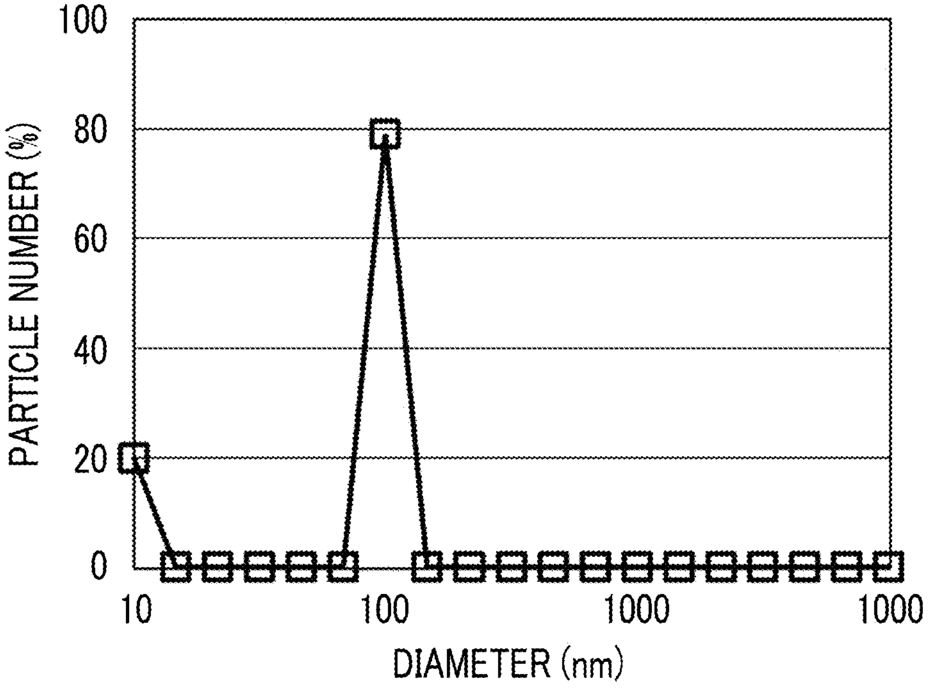
FIG. 28 is a graph showing a measurement result of sample 10 using the dynamic light scattering measurement method of the related art.
Figure 29:
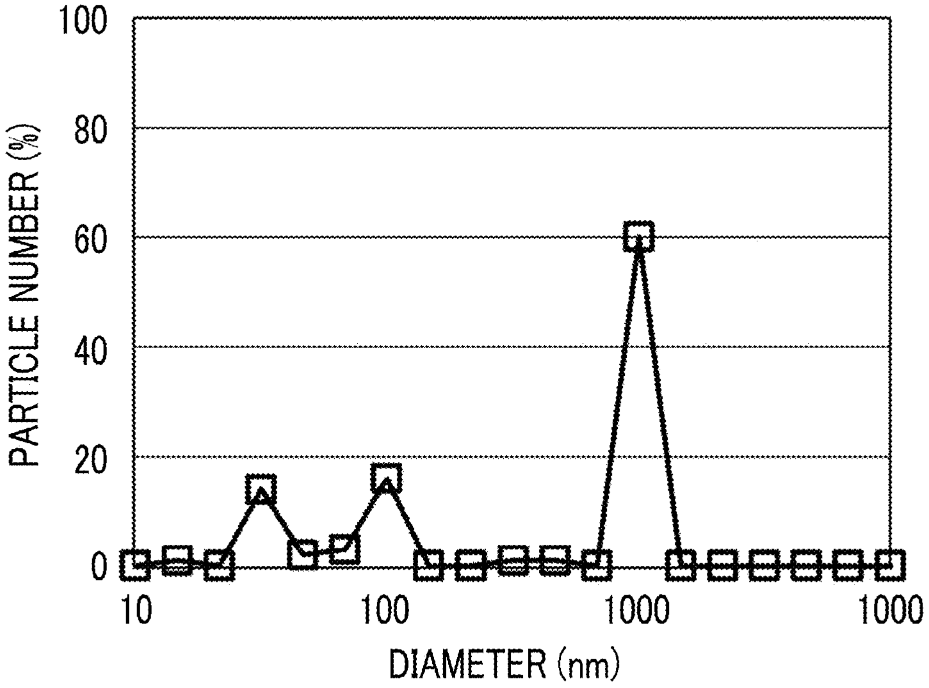
FIG. 29 is a graph showing a measurement result of sample 11 using the dynamic light scattering measurement method of the related art.
Figure 30:
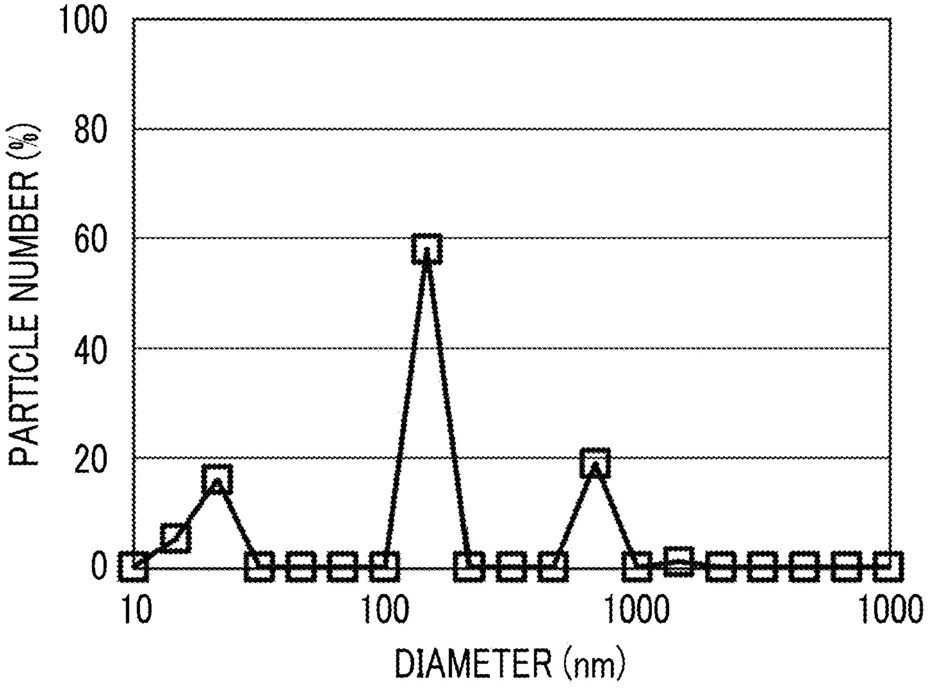
FIG. 30 is a graph showing a measurement result of sample 12 using the dynamic light scattering measurement method of the related art.

In Comparative Example 10, a result of the sample 10 is shown in FIG. 28, a result of the sample 11 is shown in FIG. 29, and a result of the sample 12 is shown in FIG. 30. The particle number shown in FIGS. 28 to 30 is a particle number having a rheological diameter obtained only from dynamic light scattering.

In FIGS. 25 to 30, □ indicates a PY74 particle, and ♦ indicates a PS particle.

In Example 10, as shown in FIGS. 25 and 26, determination is made that the samples 10 and 11 having one type of particles have one type of particles, and a particle size distribution is obtained. As shown in FIG. 27, determination is made that the sample 12 having two types of particles has two types of particles, and particle size distributions are obtained.

On the other hand, in Comparative Example 10, as shown in FIGS. 28 and 29, since it is not possible to discriminate the type of particle to being with, only the rheological diameter is shown. Furthermore, as shown in FIG. 30, since it is not possible to discriminate the type of particle to begin with, only the rheological diameter is shown.

EXPLANATION OF REFERENCES

10: dynamic light scattering measurement device
12: incidence setting unit
13: parameter setting unit
14: scattered light measurement unit
16: sample cell
18: calculation unit
20: first light source unit
22: second light source unit
24: half mirror
26, 32: condenser lens
28, 30: polarizing element
34: light detection unit
36: rotation unit

50, 52, 56, 57, 58, 59, 60, 61: profile
51: single particle
53: aggregate
54: particle
$C_1$: optical axis
θ: scattering angle

What is claimed is:

1. A dynamic light scattering measurement method for a dispersion liquid including a plurality of types of particles, the dynamic light scattering measurement method comprising:

a measurement step of measuring a scattering intensity of the dispersion liquid a plurality of times to obtain a plurality of pieces of scattering intensity data while changing a value of any one of at least a scattering angle or a measurement wavelength among measurement parameters;

a calculation step of calculating a plurality of pieces of scattering intensity time variation characteristic data and a plurality of pieces of scattering intensity parameter-dependent data from the plurality of pieces of scattering intensity data obtained by the measurement step; and a step of obtaining a particle size distribution of each type of particle of a plurality of types of particles by fitting the plurality of pieces of scattering intensity time variation characteristic data and the plurality of pieces of scattering intensity parameter-dependent data, which are obtained by the calculation step, with respect to a theoretical formula that defines a relationship between a particle diameter and the scattering intensity, wherein each of profiles of scattering intensities obtained by changing the values of the measurement parameters is different for each type of particle of the plurality of types of particles.

2. A dynamic light scattering measurement method for a dispersion liquid including particles, the dynamic light scattering measurement method comprising:

a measurement step of measuring a scattering intensity of the dispersion liquid a plurality of times to obtain a plurality of pieces of scattering intensity data while changing a value of any one of at least a scattering angle or a measurement wavelength among measurement parameters;

a calculation step of calculating a plurality of pieces of scattering intensity time variation characteristic data and a plurality of pieces of scattering intensity parameter-dependent data from the plurality of pieces of scattering intensity data obtained by the measurement step; and a determination step of determining types of particles included in the dispersion liquid by fitting the plurality of pieces of scattering intensity time variation characteristic data and the plurality of pieces of scattering intensity parameter-dependent data, which are obtained by the calculation step, with respect to a theoretical formula that defines a relationship between a particle diameter and the scattering intensity; and a step of obtaining a particle size distribution of each of the types of particles in the dispersion liquid determined by the determination step, wherein each of profiles of scattering intensities obtained by changing the values of the measurement parameters is different for each type of particle of a plurality of types of particles.

3. The dynamic light scattering measurement method according to claim 1, wherein the measurement parameter is the scattering angle.

4. The dynamic light scattering measurement method according to claim 1, wherein the measurement parameter is the measurement wavelength.

5. The dynamic light scattering measurement method according to claim 1, wherein the measurement parameters are the scattering angle and the measurement wavelength.

6. The dynamic light scattering measurement method according to claim 1, wherein, in the measurement step, a light intensity of a polarized component of scattered light of the dispersion liquid obtained by irradiating the dispersion liquid with incident light having specific polarization is measured as the scattering intensity.

7. The dynamic light scattering measurement method according to claim 1, wherein, in the measurement step, at least one of scattering intensity parameter-dependent data obtained by successively irradiating the dispersion liquid with incident light having a plurality of polarization states or scattering intensity parameter-dependent data obtained by extracting a polarized component of scattered light emitted from the dispersion liquid a plurality of times is measured.

8. The dynamic light scattering measurement method according to claim 1, wherein the calculated scattering intensity time variation characteristic data of the measurement parameters and the calculated scattering intensity parameter-dependent data of the measurement parameters are calculated based on at least one of a Mie scattering theoretical formula, a discrete dipole approximation method, or a Stokes-Einstein's theoretical formula.

9. A dynamic light scattering measurement device for a dispersion liquid including a plurality of types of particles, the dynamic light scattering measurement device comprising:

a parameter setting unit that changes a value of any one of at least a scattering angle or a measurement wavelength as measurement parameters;

a scattered light measurement unit that measures a scattering intensity of the dispersion liquid a plurality of times to obtain a plurality of pieces of scattering intensity data while changing, at the parameter setting unit, the value of any one of at least the scattering angle or the measurement wavelength among the measurement parameters; and a calculation unit that calculates a plurality of pieces of scattering intensity time variation characteristic data and a plurality of pieces of scattering intensity parameter-dependent data from the plurality of pieces of scattering intensity data obtained by the scattered light measurement unit, and obtains a particle size distribution of each type of particle of a plurality of types of particles by fitting the plurality of pieces of calculated scattering intensity time variation characteristic data and the plurality of pieces of calculated scattering intensity parameter-dependent data with respect to a theoretical formula that defines a relationship between a particle diameter and the scattering intensity, wherein each of profiles of scattering intensities obtained by changing the values of the measurement parameters is different for each type of particle of the plurality of types of particles.

10. A dynamic light scattering measurement device for a dispersion liquid including particles, the dynamic light scattering measurement device comprising:

a parameter setting unit that changes a value of any one of at least a scattering angle or a measurement wavelength as measurement parameters;

a scattered light measurement unit that measures a scattering intensity of the dispersion liquid a plurality of times to obtain a plurality of pieces of scattering intensity data while changing, at the parameter setting unit, the value of any one of at least the scattering angle or the measurement wavelength among the measurement parameters; and a calculation unit that calculates a plurality of pieces of scattering intensity time variation characteristic data and a plurality of pieces of scattering intensity parameter-dependent data from the plurality of pieces of scattering intensity data obtained by the scattered light measurement unit, determines types of particles in the dispersion liquid by fitting the plurality of pieces of calculated scattering intensity time variation characteristic data and the plurality of pieces of calculated scattering intensity parameter-dependent data with respect to a theoretical formula that defines a relationship between a particle diameter and the scattering intensity, and in a case where the types of particles in the dispersion liquid are determined, obtains a particle size distribution of each particle in the dispersion liquid, wherein each of profiles of scattering intensities obtained by changing the values of the measurement parameters is different for each type of particle of a plurality of types of particles.

11. The dynamic light scattering measurement device according to claim 9, wherein the measurement parameter is the scattering angle.

12. The dynamic light scattering measurement device according to claim 9, wherein the measurement parameter is the measurement wavelength.

13. The dynamic light scattering measurement device according to claim 9, wherein the measurement parameters are the scattering angle and the measurement wavelength.

14. The dynamic light scattering measurement device according to claim 9, wherein the scattered light measurement unit measures a light intensity of a polarized component of scattered light of the dispersion liquid obtained by irradiating the dispersion liquid with incident light having specific polarization, as the scattering intensity.

15. The dynamic light scattering measurement device according to claim 9, wherein the scattered light measurement unit measures at least one of scattering intensity parameter-dependent data obtained by successively irradiating the dispersion liquid with incident light having a plurality of polarization states or scattering intensity parameter-dependent data obtained by extracting a polarized component of scattered light emitted from the dispersion liquid a plurality of times.

16. The dynamic light scattering measurement device according to claim 9, wherein the calculated scattering intensity time variation characteristic data of the measurement parameters and the calculated scattering intensity parameter-dependent data of the measurement parameters are calculated based on at least one of a Mie scattering theoretical formula, a discrete dipole approximation method, or a Stokes-Einstein's theoretical formula.

17. The dynamic light scattering measurement method according to claim 2, wherein the measurement parameter is the scattering angle.

18. The dynamic light scattering measurement method according to claim 2, wherein the measurement parameter is the measurement wavelength.

* * * * *